United States Patent
Yao et al.

(10) Patent No.: US 9,729,311 B2
(45) Date of Patent: Aug. 8, 2017

(54) PROXY SYSTEM FOR SECURITY PROCESSING WITHOUT ENTRUSTING CERTIFIED SECRET INFORMATION TO A PROXY

(71) Applicant: Oki Electric Industry Co., Ltd., Tokyo (JP)

(72) Inventors: Taketsugu Yao, Tokyo (JP); Jun Nakashima, Tokyo (JP); Kiyoshi Fukui, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 661 days.

(21) Appl. No.: 13/630,226

(22) Filed: Sep. 28, 2012

(65) Prior Publication Data

US 2013/0086378 A1 Apr. 4, 2013

(30) Foreign Application Priority Data

Sep. 29, 2011 (JP) ................................. 2011-215308

(51) Int. Cl.
*H04L 29/06* (2006.01)
*H04L 9/00* (2006.01)

(52) U.S. Cl.
CPC .......... *H04L 9/006* (2013.01); *H04L 63/0281* (2013.01); *H04L 63/0884* (2013.01); *H04L 2209/76* (2013.01)

(58) Field of Classification Search
CPC . H04L 9/006; H04L 63/0281; H04L 63/0884; H04L 2209/76
USPC ....................................................... 713/156
See application file for complete search history.

(56) References Cited

U.S. PATENT DOCUMENTS

| | | | |
|---|---|---|---|
| 6,233,341 B1 * | 5/2001 | Riggins | 380/277 |
| 6,654,350 B1 * | 11/2003 | Ramey | H04L 12/14 370/252 |
| 7,016,973 B1 * | 3/2006 | Sibal | H04L 69/16 709/203 |
| 7,197,643 B2 | 3/2007 | Takase | |

(Continued)

FOREIGN PATENT DOCUMENTS

| | | |
|---|---|---|
| JP | 2002-82907 | 3/2002 |
| JP | 2004-15241 | 1/2004 |

(Continued)

OTHER PUBLICATIONS

Office Action issued by Japan Patent Office on Nov. 26, 2013 with English translation.

(Continued)

*Primary Examiner* — John B King
(74) *Attorney, Agent, or Firm* — Rabin & Berdo, P.C.

(57) ABSTRACT

First communication units use a public key thereof certified by a certification authority on a PKI (Public Key Infrastructure), which is held by the first communication units in advance, and a secret key of the first communication units or delegation information generated by using secret information, as public key certificate, of the first communication units to thereby allow a proxy server to perform security processing, i.e. key exchange processing, authentication processing or processing for providing compatibility of encryption schemes, between the first communication units and a second communication unit on behalf of the first communication units.

6 Claims, 17 Drawing Sheets

(56) References Cited

U.S. PATENT DOCUMENTS

| | | | |
|---|---|---|---|
| 8,136,165 B2* | 3/2012 | Takala | H04L 63/083 709/238 |
| 8,386,780 B2 | 2/2013 | Watanabe et al. | |
| 8,452,974 B2 | 5/2013 | Sakumoto | |
| 8,515,066 B2* | 8/2013 | Saito et al. | 380/255 |
| 2002/0035685 A1 | 3/2002 | Ono et al. | |
| 2004/0190468 A1* | 9/2004 | Saijonmaa | H04L 29/06027 370/312 |
| 2006/0004662 A1* | 1/2006 | Nadalin et al. | 705/50 |
| 2007/0064950 A1 | 3/2007 | Suzuki et al. | |
| 2007/0245414 A1* | 10/2007 | Chan et al. | 726/12 |
| 2007/0263559 A1* | 11/2007 | Gossain | H04L 45/16 370/328 |
| 2008/0126794 A1* | 5/2008 | Wang et al. | 713/151 |
| 2008/0209028 A1* | 8/2008 | Kurup | H04L 12/2602 709/224 |
| 2009/0064280 A1* | 3/2009 | Babeanu et al. | 726/3 |
| 2009/0199009 A1* | 8/2009 | Chia | H04L 63/0281 713/176 |
| 2010/0119069 A1 | 5/2010 | Kamikura et al. | |
| 2011/0084800 A1* | 4/2011 | Ko | H04L 9/3242 340/5.74 |
| 2012/0198037 A1* | 8/2012 | Shelby | H04L 41/0213 709/223 |

FOREIGN PATENT DOCUMENTS

| | | |
|---|---|---|
| JP | 2007088799 A | 4/2007 |
| JP | 2008-148033 A | 6/2008 |
| JP | 2010-278482 A | 12/2010 |
| WO | WO-2008146395 A1 | 12/2008 |

OTHER PUBLICATIONS

Japanese Office Action dated Jun. 11, 2013 with English translation.

* cited by examiner

US 9,729,311 B2

PROXY SYSTEM FOR SECURITY PROCESSING WITHOUT ENTRUSTING CERTIFIED SECRET INFORMATION TO A PROXY

CROSS-REFERENCE TO RELATED APPLICATION

The present patent application claims a priority under 35 U.S.C. §119 from Japanese patent application No. 2011-215308 filed on Sep. 29, 2011, of which the entire disclosure including the specification, claims, accompanying drawings and abstract of the disclosure is incorporated herein by reference in its entirety.

BACKGROUND OF THE INVENTION

Field of the Invention

The present invention relates to a security processing proxy system, and more particularly to such a system that has a proxy server, for example, acting for a communication unit to carry out security processing such as key exchange, authentication or encrypted communication path establishment between the communication unit and another communication unit.

Description of the Background Art

In order to apply sensors to such a field of social infrastructure that requires high reliability and quality, e.g. systems for disaster prevention surveillance, traffic control and finance, it is necessary to establish security in communications between communication units of a service providing server and communication units including sensors.

In order for communication units including sensors to establish a secured end-to-end communication paths to any communication units of service providing server, for example, it is necessary for those communication units to transmit information about key exchange processing, authentication processing, compatibility of encryption schemes and the like between each other. Alternatively, it is necessary to provide a proxy server which is adapted to act for either of the communication units to execute key exchange processing or authentication processing, or to establish compatibility with the other communication unit.

SUMMARY OF THE INVENTION

It is an object of the present invention to provide a security processing proxy system for reliably carrying out security processing such as key exchange, authentication or encrypted communication path establishment between communication units. It is another object of the invention to provide a communication unit and a proxy server advantageously applicable to such a security processing proxy system.

In accordance with the present invention, in a security processing proxy system, in which a proxy server which acts for a first communication unit to conduct security processing with a second communication unit, the security processing including key exchange processing, authentication processing or processing for providing compatibility of an encryption scheme, the first communication unit holds a public key of the first communication unit certified by a certification authority on a public key infrastructure (PKI) as well as a secret key of the first communication unit or its own secret information as a public key certificate of the first communication unit. The first communication unit comprises: a delegation information generator using the secret information of the first communication unit to generate delegation information required for the security processing; and a delegation information notifier supplying the delegation information to the proxy server. The proxy server comprises: a delegation information acquirer acquiring the delegation information from the first communication unit; and a security processing proxy transmitting the delegation information to the second communication unit to perform the security processing with the second communication unit. The second communication unit comprises: a receiver receiving the delegation information from the proxy server; and a security processor using a certification authority public key held for verifying the public key certificate as being issued by the certification authority on the PKI to certify that the delegation information is generated by the first communication unit to thereby carry out the security processing with the proxy server.

Also in accordance with the present invention, in a security processing proxy system, in which a proxy server which acts for a first communication unit to conduct security processing with a second communication unit, the security processing including key exchange processing, authentication processing or processing for providing compatibility of encryption schemes, the first communication unit holds a public key of the first communication unit certified by a certification authority on a public key infrastructure (PKI), a secret key of the first communication unit and a public key certificate of the first communication unit as well as a certification authority public key for verifying the public key certificate as being issued by the certificate authority on the PKI. The first communication unit comprises: a receiver receiving from the proxy server the public key certificate of the proxy server certified by the certification authority on the PKI; a delegation information generator using the certification authority public key to verify the public key certificate of the proxy server to thereby acquiring the public key of the proxy server, the delegation information generator producing an entrust public key certificate for certifying that the public key of the proxy server is signed by the secret key of the first communication unit, the delegation information generator using the entrust public key certificate and the public key certificate of the first communication unit to generate delegation information necessary for the security processing; and a delegation information notifier sending the delegation information to the proxy server. The proxy server comprises: a delegation information acquirer acquiring the delegation information from the first communication unit; and a security processing proxy transmitting the delegation information to the second communication unit to perform the security processing with the second communication unit. The second communication unit comprises: a receiver receiving the delegation information from the proxy server; and a security processor using the certification authority public key acquired beforehand for verifying the public key certificate as being issued by the certification authority on the PKI to certify that the delegation information is generated by the first communication unit to thereby carry out the security processing with the proxy server.

Further in accordance with the present invention, in a communication unit which permits a proxy server to act for the communication unit to conduct security processing with another communication unit, the security processing including key exchange processing, authentication processing or processing for providing compatibility of an encryption scheme, the communication unit holds a public key of the communication unit certified by a certification authority on a public key infrastructure (PKI) as well as a secret key of the communication unit or its own secret information as a public key certificate of the communication unit. The communication unit comprises: a delegation information generator using the secret information of the communication unit to generate delegation information required for the security processing; and a delegation information notifier supplying the delegation information to the proxy server.

Still further in accordance with the present invention, in a communication unit which permits a proxy server to act for the communication unit to conduct security processing with another communication unit, the security processing including key exchange processing, authentication processing or processing for providing compatibility of an encryption scheme, the communication unit holds a public key of the communication unit certified by a certification authority on a public key infrastructure (PKI), a secret key of the communication unit and a public key certificate of the communication unit as well as a certification authority public key to be used for certifying the public key certificate as being issued by the certificate authority on the PKI. The communication unit comprises: a receiver receiving from the proxy server the public key certificate of the proxy server certified by the certification authority on the PKI; and a delegation information generator using the certification authority public key to verify the public key certificate of the proxy server to thereby acquire the public key of the proxy server. The delegation information generator produces an entrust public key certificate for certifying that the public key of the proxy server is signed by the secret key of the communication unit, and the delegation information generator uses the entrust public key certificate and the public key certificate of the communication unit to generate delegation information necessary for the security processing. The communication unit further comprises a delegation information notifier sending the delegation information to the proxy server.

Yet further in accordance with the invention, a proxy server for performing proxy of security processing on an encrypted communication between a first communication unit and another communication unit, where the security processing includes key exchange processing, authentication processing or processing for providing compatibility of an encryption scheme, comprises: a delegation information acquirer acquiring from the first communication unit delegation information necessary for performing the security processing; and a security processing proxy transmitting the delegation information to the other communication unit to conduct the security processing with the other communication unit.

Still further in accordance with the invention, there is provided a communication program which controls, when stored in and executed by a computer, the computer to implement any of the security processing proxy systems stated above.

Also in accordance with the invention, there is provided a communication program which controls, when stored in and executed by a computer, the computer to serve as any of the communication systems and proxy server stated above.

The inventive concept disclosed in the application may also be defined in ways other than in the claims presented below. The inventive concept may consist of several separate inventions particularly if the invention is considered in light of explicit or implicit subtasks or from the point of view of advantages achieved. In such a case, some of the attributes included in the claims may be superfluous from the point of view of separate inventive concepts. Within the framework of the basic inventive concept, features of different embodiments are applicable in connection with other embodiments.

The present invention may be applied to, for example, a case where a proxy server which acts for a communication unit to reliably carry out security processing between communication units. The processing may include key exchange, authentication and encrypted communication path establishment, for example.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

A. Basic Concept of the Invention

Figure 1:
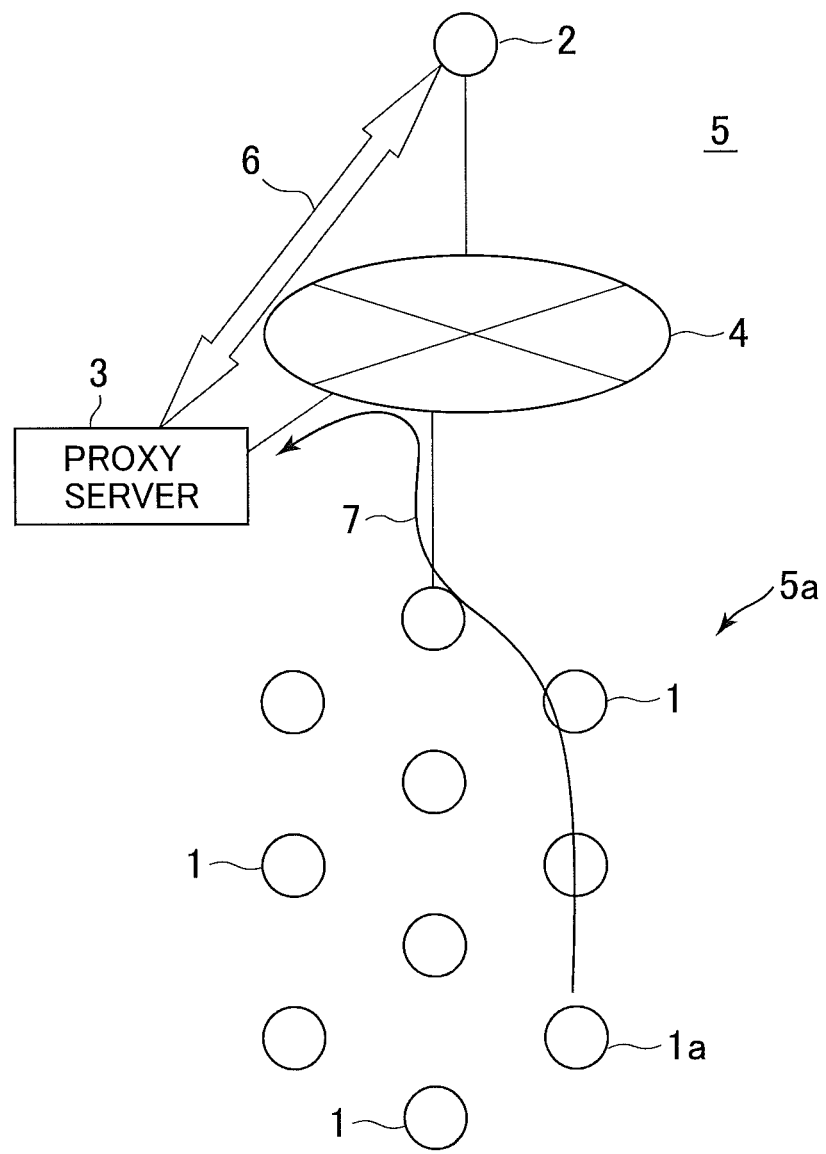
FIG. 1 schematically shows a preferred embodiment of telecommunications network system according to the present invention.

FIG. 1 schematically shows an example of telecommunications network system for use in describing the basic concept of the present invention. In the figure, a telecommunications network system 5 includes one or more communication units such as first and second communication units 1 and 2, a proxy server 3, and a telecommunications network 4 for establishing connections between the first and second communication units 1 and 2 and the proxy server 3. For instance, the first communication units 1 may include sensors or equivalent adapted to sense some physical characteristic to produce signals representative of the characteristic thus sensed, and may be adapted to transmit and receive the signals to and from adjacent ones of the first communication units 1 to thereby form a multihop network 5a. The second communication unit 2 may be a server adapted for providing a certain service over the telecommunications network 4 to the first communication units 1. In the figure, one of the first communication units 1 which is of interest is denoted with a reference numeral 1a.

According to the present invention, the proxy server 3 executes security processing 6 between the first and second communication units 1 and 2 on behalf of a first communication unit 1a without entrusting to the proxy server 3 secret information of the first communication unit 1 certified by a certification authority (CA) which is not specifically shown in the figure.

The term "security processing" may cover, in this context, for example, key exchange processing, certification processing and encrypted communication path establishment processing, which may be performed between the first and second communication units 1 and 2.

The present invention proposes to apply two alternatives based on the PGP (Pretty Good Privacy) encryption and a certification authority in order to implement security processing between the first and second communication units 1 and 2.

In the one alternative relying upon the PGP encryption, the second communication unit 2 checks whether or not the first communication unit 1a leaves the security processing to the proxy server 3, and then conducts the security processing with the proxy server 3 as a substitute for the first communication unit 1a.

In the other alternative utilizing a certification authority, the second communication unit 2 confirms the use of secret authentication information of the first communication unit 1a in the security processing with the proxy server 3 to conduct the security processing with the proxy server 3 instead of the first communication unit 1a.

In connection with both of the above alternatives, based on the PGP encryption and the certification authority, any types of public-key encryption algorithms may be applied to, e.g. encryption or generation of signatures. For the sake of simplicity in description, the following preferred embodiments may employ an algorithm using an elliptic curve cryptosystem. In this algorithm, a symbol G is a generator of a cyclic group G1, in which a public key $P\_1 = d\_1 \cdot G \in G1$ is generated, which is associated with a secret key $d\_1$ for the first communication unit 1, while another public key $P\_2 = d\_2 \cdot G \in G1$ is generated, which is associated with another secret key $d\_2$ for the second communication unit 2. For the cyclic group G1 and another cyclic group G2, a pairing function e, which outputs a generator of a yet another group G3 which has the generators of the groups G1 and G2 inputted, is indicated as $G1 \times G2 \to G3$. A function F, which has its range of value having the generator of the cyclic group G2, is indicated as $\{0, 1\}^* \to G2$.

Each of the devices, i.e. the first communication units 1, the second communication unit 2 and the proxy server 3, includes means for checking for the validity of the public keys of the other devices. By way of example, each device may have a public key P_CA prepared in advance for verifying a signature issued by the certification authority, or include means for obtaining such a signature.

B. Preferred Embodiment

Now, a preferred embodiment of a security processing proxy system of the present invention will be described in detail with reference to the accompanying drawings. With reference to FIG. 1, the first communication units 1 include respective sensors, not shown, and form the multihop network 5a to transmit and receive information between neighboring first communication units 1, as described earlier.

The second communication unit 2 is configured to act as a server, for instance, to provide a service over the telecommunications network 4 to the first communication units 1. The first communication units 1 may additionally be provided with the functions of the second communication unit 2.

The proxy server 3 is designed to obtain delegation information 7 generated in the first communication units 1 to execute security processing between the first communication units 1 and the second communication unit 2 on behalf of the first communication units 1.

Figure 2:
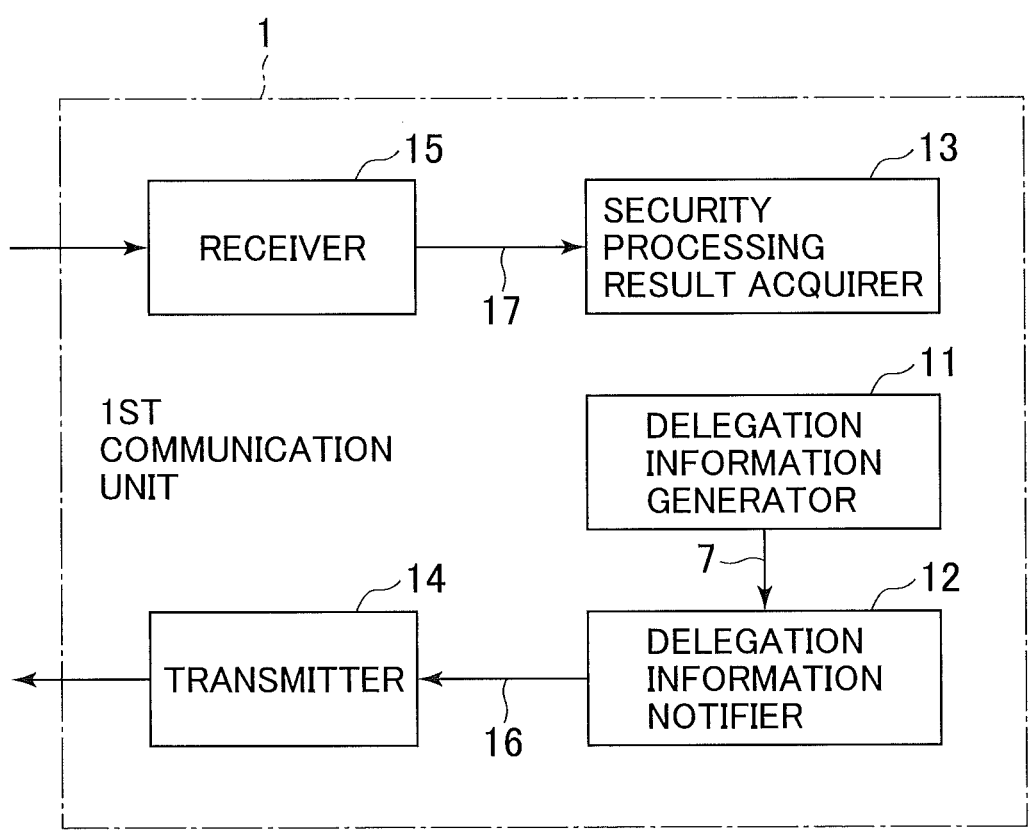
FIG. 2 is a schematic block diagram showing the internal structure of a first communication unit included in the preferred embodiment shown in FIG. 1.

FIG. 2 is a schematic block diagram showing the internal structure of one of the first communication units 1, which may be the same in structure as each other over the network 5a. Throughout the application, like components are designated with the same reference numerals. The first communication unit 1 may be implemented by, for example, a processor system, not shown, adapted for storing and running program sequences and including a CPU (Central Processor Unit), ROM (Read-Only Memory), RAM (Random Access Memory), EEPROM (Electronic Erasable Programmable ROM), hard disk drive, and interface for establishing communication with other communication units. The first communication unit 1 may be implemented in the form of software such that program sequences for executing the processing in accordance with the illustrative embodiment are installed in the processing system. In this case, the first communication unit 1 may be represented in the form of schematic functional blocks as illustrated in FIG. 2. In this connection, the word "circuit" or "device" may be understood not only as hardware, such as an electronics circuit, but also as a function that may be implemented by software installed and executed on a computer. The above is also the case with other constituent elements and illustrative embodiments that will be described below.

With reference to FIG. 2, the first communication unit 1 includes a delegation information generator 11, a delegation information notifier 12, a security processing result acquirer 13, a transmitter 14 and a receiver 15, which are interconnected as illustrated.

The delegation information generator 11 is configured to use secret information, certified by a certification authority, of the own first communication unit 1 on which the delegation information generator 1 is included to thereby generate delegation information 7 to be entrusted to the proxy server 3. Signals or data may be designated with reference numerals of connections on which they are conveyed.

Secret information certified by a certification authority may include, in the illustrative embodiment, a secret or private key d_1 associated with a public key P_1 for the own unit 1 certified by a certification authority (CA) on a public key infrastructure (PKI), not shown. In this patent application, a secret key for a certification authority CA may be represented by certification authority secret key d_CA, and a public key certificate may be represented by certification authority public key certificate Cert(X, Y). Furthermore, a public key whose certification authority public key certificate Cert(X, Y) is certified by a certifier X is a certification authority public key Y. Accordingly, the public key certificate of the first communication unit 1 may be represented by public key certificate Cert(d_CA, P_1).

The delegation information 7 to be trusted to the proxy server 3 is generated by a first communication unit 1 by using its own secret information. How to generate delegation information 7 will be described in more detail later in the description about the operation of the illustrative embodiment.

The delegation information generator 11 may be adapted to have the delegation information 7 additionally carry information on a cryptographic algorithm, an encryption scheme and/or an authentication method which are supported by the first communication unit 1. That makes it possible for the first communication unit 1 to leave the encrypted communication path establishment to the proxy server 3 so that the proxy server 3 acts on behalf of the first unit 1 to interface a security system to be used between the first communication unit 1 and second communication unit 2.

The delegation information generator 11 then supplies the generated delegation information 7 to the delegation information notifier 12.

The delegation information notifier 12 is adapted to convert the delegation information 7 generated by the delegation information generator 11 into a delegation information signal 16 so as to deliver the information signal to the proxy server 3 through the transmitter 14.

It may not be restricted how to notify the proxy server 3 of the delegation information 7. For example, the delegation information signal 16 may be sent to the proxy server 3 over the telecommunications network 4 or by hand delivery. In addition, the delegation information notifier 12 may encrypt the delegation information signal 16 or add an authenticator code to the signal 16 in order to deliver the signal securely to the proxy server 3.

The security processing result acquirer 13 functions as acquiring a result of security processing carried out by the proxy server 3 on behalf of a first communication unit 1. More specifically, the security processing result acquirer 13 receives information 17 about the security processing result from the receiver 15 to acquire the result of the security processing conducted between the proxy server 3 and the second communication unit 2. In order to securely acquire the information 17 about the security processing result from the proxy server 3, the system 5 may be adapted to encrypt or certify the information 17 on the security processing result, which the security processing result acquirer 13 may in turn decrypt the information or verify the certified information.

The information on the result of the security processing may include, for example, key information defined through the exchange process of a key between the proxy server 3 and the second communication unit 2, or may include a result of certification carried out between the proxy server 3 and the second unit 2 or information on a key defined concurrently with the certification. Alternatively, the information on the result of the security processing may include a result from the process of establishing an encrypted communication path, such as IPsec (Internet Protocol Security) or TLS (Transport Layer Security), when processed between the proxy server 3 and the second communication unit 2. The information on the result of encrypted communication path establishment may include information about a cryptographic algorithm, an encryption scheme and/or a key to be used for establishing secure communication between the first and second communication units 1 and 2, as well as identifications for identifying the aforesaid information, as with an SA (Security Association) established by the IPsec.

The transmitter 14 is adapted for transmitting the delegation information 16 received from the delegation information notifier 12 toward the proxy server 3.

The receiver 15 is adapted for supplying the security processing result acquirer 13 with the information 17 about the security processing result sent from the proxy server 3.

Figure 3:
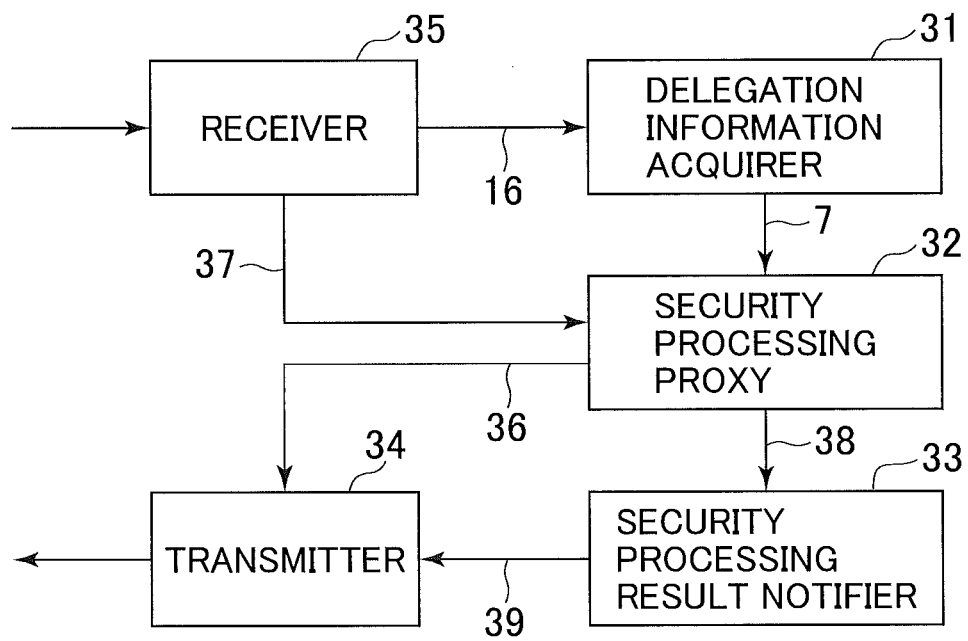
FIG. 3 is a schematic block diagram showing the internal structure of a proxy server included in the preferred embodiment.

FIG. 3 is a schematic block diagram showing the internal structure of the proxy server 3 of the preferred embodiment. The proxy server 3 may also be implemented by, for example, a processor system, not shown, adapted for storing and executing program sequences and including a CPU, ROM, RAM, EEPROM, hard disk drive, and interface for establishing communication with other communication units. The proxy server 3 may be implemented in the form of software such that program sequences for executing the processing in accordance with the illustrative embodiment are installed in the processing system. In this case, the proxy server 3 may be represented in the form of schematic functional blocks as illustrated in FIG. 3.

With reference to FIG. 3, the proxy server 3 includes a delegation information acquirer 31, a security processing proxy 32, a security processing result notifier 33, a transmitter 34 and a receiver 35, which are interconnected as illustrated.

The delegation information acquirer 31 is adapted to acquire from a first communication unit 1 the delegation information 7 required to execute the security processing on behalf of the first unit 1. In order to securely acquire the delegation information signal 16 from the first communication units 1, the system 5 may be adapted to encrypt or certify the information signal 16, which the delegation information acquirer 31 may in turn decrypt the delegation information signal 16 or verify the certified information. The delegation information acquirer 31 derives the delegation information 7 from the received delegation information signal 16 to supply the information 7 to the security processing proxy 32.

The security processing proxy 32 serves to execute the security processing between a first communication unit 1 and the second communication unit 2 on behalf of the first unit 1. The security processing may include the key exchange, authentication, encrypted communication path establishment, by way of example, but may not be limited thereto. In the security processing, the security processing proxy 32 derives open information 36 about the public key certificate and/or an identification ID_2 of the second communication unit 2 from the delegation information 7 received from the delegation information acquirer 31 and supplies the information 36 to the transmitter 34. In this regard, the proxy 32 receives from the receiver 35 open information 37, such as the public key certificate of the second communication unit 2.

The security processing proxy 32 uses the open information 37 exchanged with the second communication unit 2 and the delegation information 7 generated by the first communication unit 1 to carry out the security processing between the first and second communication units on behalf of the first unit 1. That makes it possible for the proxy server 3 to securely conduct the security processing between the first and second communication units 1 and 2 on behalf of the first communication unit 1 without getting the secret information of the first unit 1 certified by the certification authority. The detailed description about how the above-mentioned security processing may be implemented in the PGP encryption and certification authority will be made later in connection with the description about the operation in the illustrative embodiment.

The security processing proxy 32 then provides the security processing result notifier 33 with a result of the security processing 38 obtained by executing the security processing with the second communication unit 2.

The security processing result notifier 33 is adapted for using the security processing result 38 received from the security processing proxy 32 to produce notification information 39 on the security processing result 38 to be sent to the first communication unit 1. The security processing result notifying information 39 may be intended to be sent to the first communication unit 1 over the telecommunications network 4, but may not be limited thereto.

In order to securely transfer the security processing result 38 to the first communication unit 1, the security processing result notifier 33 may encrypt the security processing result notifying information 39 or add an authentication to the notifying information 39. The notifier supplies the security processing result notifying information 39 thus produced to the transmitter 34.

The transmitter 34 is configured to send toward the second communication unit 2 the open information 36 about the public key certificate received from the security processing proxy 32. The transmitter 34 is also adapted to transmit the security processing result notifying information 39 supplied from the security processing result notifier 33 toward a first communication unit 1.

The receiver 35 is adapted for receiving the delegation information notifying information 16 transmitted from a first communication unit 1 to supply it to the delegation information acquirer 31. The receiver 35 is further adapted to receive the open information 37 about a public key certificate transmitted from the second communication unit 2 to supply the latter to the security processing proxy 32.

Now, with reference to FIG. 4, the internal structure of the second communication unit 2 will be described. The second communication unit 2 may also be implemented by a processor system, not shown, adapted for storing and executing program sequences and including, for example, a CPU, ROM, RAM, EEPROM, hard disk, and interface for establishing communication with other communication units. The second communication unit 2 may be implemented in the form of software such that program sequences for executing the processing in accordance with the illustrative embodiment are installed in the processing system. In this case also, the second communication unit 2 may be represented in the form of schematic functional blocks as illustrated in FIG. 4.

Figure 4:
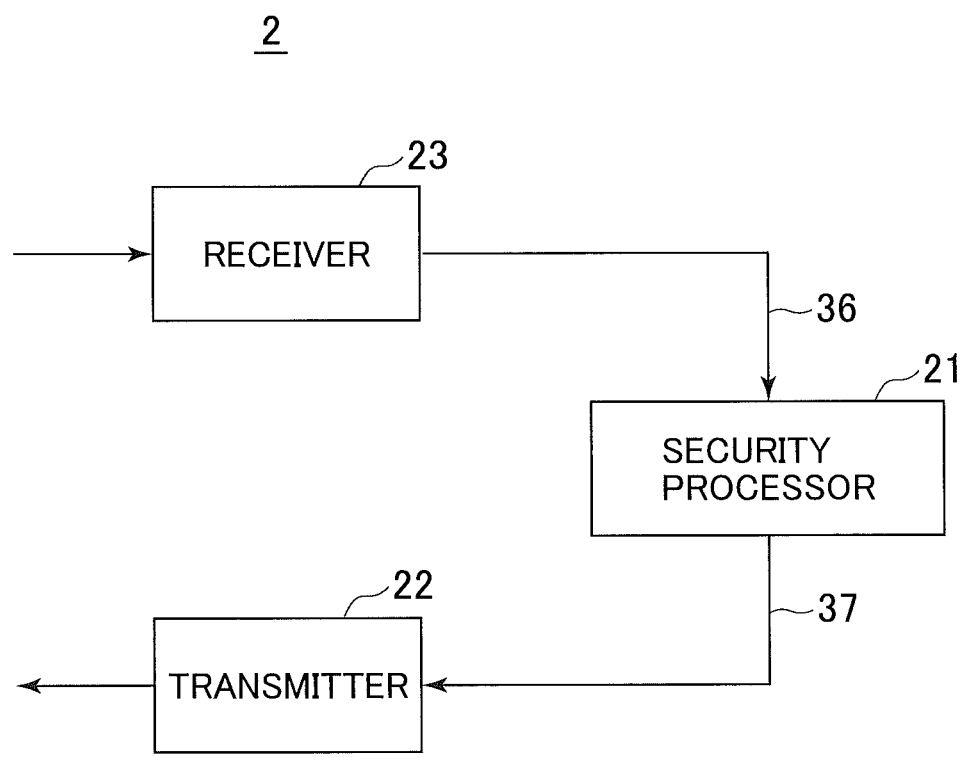
FIG. 4 is a schematic block diagram showing the internal structure of a second communication unit included in the preferred embodiment.

As shown in FIG. 4, the second communication unit 2 includes a security processor 21, a transmitter 22 and a receiver 23, which are interconnected as illustrated. The security processor 21 functions to execute the security processing with other communication units, such as key exchange, certification or encrypted communication path establishment.

In the security processing, the security processor 21 supplies the transmitter 22 with its own open information 37 on, e.g. a public key certificate $Cert(d\_CA, P\_2 (=d\_2 \cdot G \in G1))$. The security processor 21 receives from the receiver 23 open information 36 such as a public key certificate which is derived from the delegation information 7 given to the proxy server 3 from the first communication unit 1.

The security processor 21 uses the open information 36 received from the receiver 23 and its own secret key d_2 to certify that the open information 36 is generated in the first communication unit 1 so as to confirm that the proxy server 3 is vested with the authority to execute the security processing on behalf of the first communication unit 1. When the authorization given by the first communication unit 1 to the proxy server 3 for performing the processing has been confirmed, the security processor 21 can perform the security processing in safety with the proxy server 3. The detailed description about how the security processor 21 conducts the security processing by using the PGP encryption and certification authority will be made later in connection with the description about the operation in the illustrative embodiment.

The transmitter 22 is adapted to transmit the open information 37 received from the security processor 21, such as the public key certificate which is required to carry out the security processing with the proxy server 3.

The receiver 23 is configured to receive open information on a public key certificate needed to perform the security processing with the proxy server 3 and then supply the open information 36 to the security processor 21.

Now, the operation of the security processing proxy system according to the preferred embodiment will be described in detail by referring to FIGS. 5 to 9.

In the following, the description will be made on three operations of the security processing, i.e. key exchange, certification and encrypted communication path establishment, by using a PGP encryption and a certification authority.

The proxy server 3 holds a certification authority public key P_CA for verifying a public key certificate issued by a certification authority CA, not shown.

The second communication unit 2 holds a public key certificate $Cert(d\_CA, P\_2(=d\_2 \cdot G \in G1))$, a secret key d_2 which is associated with an own public key P_2 and the public key P_CA for verifying the public key certificate issued by the certification authority CA.

Figure 5:
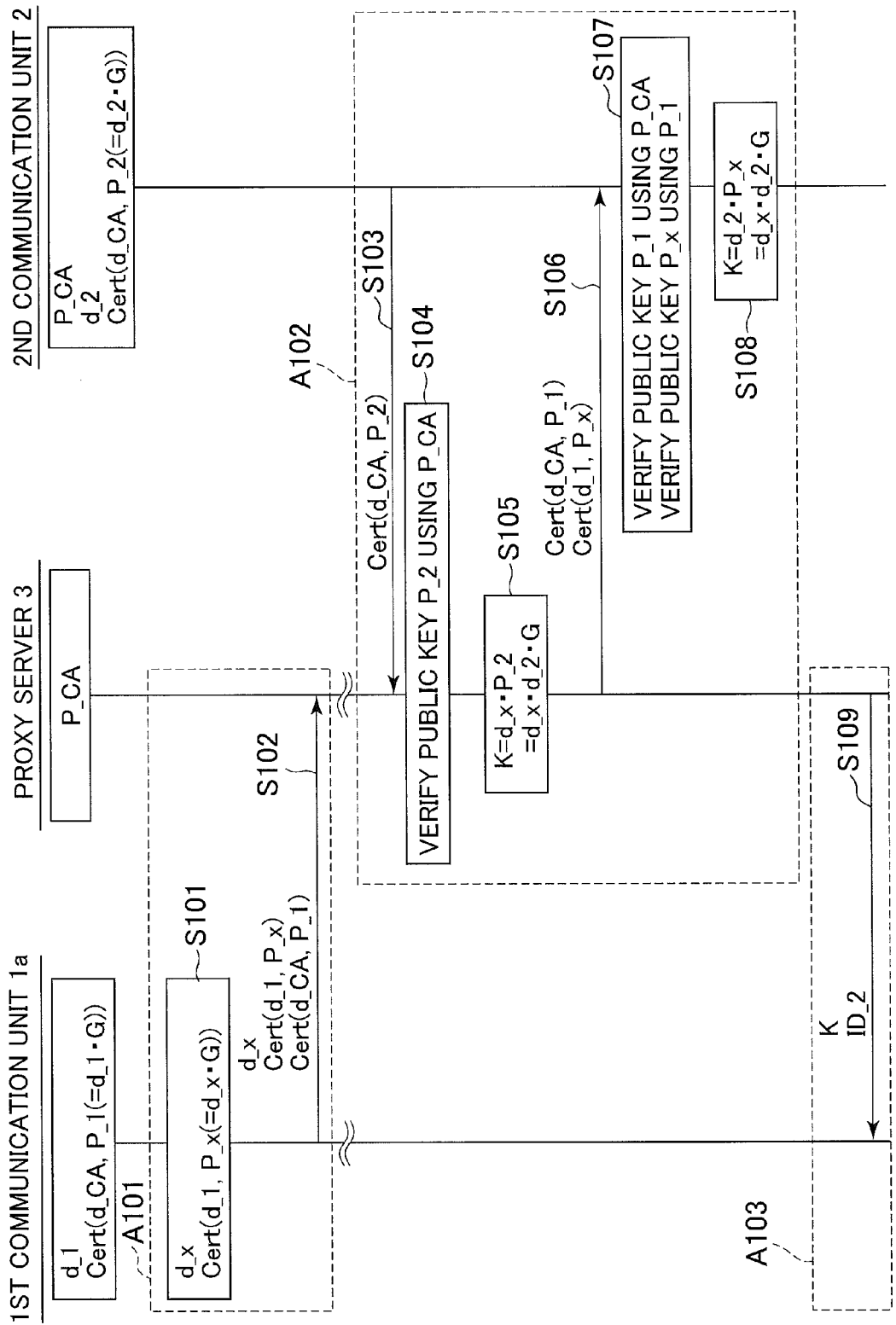
FIG. 5 is a sequence chart useful for understanding the proxy operation of key exchange relying upon the PGP (Pretty Good Privacy) encryption in the preferred embodiment.

FIG. 5 is a sequence chart useful for understanding the operation for executing key exchange processing proxy by using the PGP encryption.

In the process A101 of authorizing proxy, the first communication unit 1 holds a public key certificate $Cert(d\_CA, P\_1(=d\_1 \cdot G \in G1))$ issued for a first communication unit, e.g. the unit 1*a*, by the certification authority CA, not shown, and a secret key d_1 of the first unit 1*a* which is associated with a public key P_1 of the first unit 1*a*. The public key certificate Cert(d_CA, P_1(=d_1•G∈G1)) of the first communication unit 1a is obtained by certifying the public key P_1 of the first communication unit 1a by the certification authority CA. In a first step, the delegation information generator 11 of the first communication unit 1a generates an entrust public key in pair according to any public key cryptographic algorithms, i.e. a pair of entrust secret key d_x and entrust public key P_x. The delegation information generator 11 further generates an entrust public key certificate Cert(d_1, P_x(=d_x•G∈G1)) for the generated entrust public key P_x by attaching the signature with its own secret key d_1 (step S101).

The delegation information generator 11 then produces delegation information 7 including the entrust public key certificate Cert(d_1, P_x(=d_x•G∈G1)) and the public key certificate Cert(d_CA, P_1) of the first communication unit 1a as well as the entrust secret key d_x, and supplies the delegation information 7 to the delegation information notifier 12. The delegation information notifier 12 in turn generates a delegation information signal 16 for notifying the proxy server 3 of the delegation information 7, and sends the generated signal 16 to the proxy server 3 via the transmitter 14 (step S102).

In the proxy server 3, the delegation information acquirer 31 receives the delegation information signal 16 the receiver 35 has received so as to derive the entrust secret key d_x and the entrust public key certificate Cert(d_1, P_x) generated by the first communication unit 1a as well as the entrust public key certificate Cert(d_CA, P_1) of the first unit 1a.

Subsequently, the delegation information acquirer 31 supplies the security processing proxy 32 with the entrust secret key d_x, the entrust public key certificate Cert(d_1, P_x) and the public key certificate Cert(d_CA, P_1) of the first unit 1a.

In the process A102 of key exchange proxy, the key exchange processing is started when the proxy server 3 receives from the first communication unit 1a a key exchange request to start the exchange processing between the first communication unit 1a and the second communication unit 2. The second communication unit 2 receives a key exchange request from the proxy server 3 and in turn sends the proxy server 3 with its own public key certificate Cert(d_CA, P_2).

The security processing proxy 32 of the proxy server 3 receives the public key certificate Cert(d_CA, P_2) of the second communication unit 2 via the receiver 35 (step S103).

The security processing proxy 32 then uses the certification authority public key P_CA generated by the certification authority CA to verify the public key certificate Cert(d_CA, P_2) of the second communication unit 2, and obtain the public key P_2 of the second unit 2 (step S104).

Subsequently, the security processing proxy 32 uses the public key P_2 of the second communication unit 2 and the entrust secret key d_x given from the first communication unit 1a so as to generate a common key K=d_x•P_2=d_x•d_2•G∈G1 according to any common key cryptographic algorithms (step S105). The common key cryptographic algorithm may be defined on the basis of a public key cryptographic algorithm used for the delegation information.

The security processing proxy 32 then sends the public key certificate Cert(d_CA, P_1) given by the first communication unit 1a and the entrust public key certificate Cert (d_1, P_x) generated by the first communication unit 1a to the second communication unit 2 through the transmitter 34 (step S106).

In the second communication unit 2, the security processor 21 receives from the proxy server 3 through the receiver 23 the public key certificate Cert(d_CA, P_1) of the first communication unit 1a and the entrust public key certificate Cert(d_1, P_x) generated by the first unit 1a.

The security processor 21 uses the certification authority public key P_CA of the certification authority CA to verify the public key certificate Cert(d_CA, P_1) of the first communication unit 1a to thereby acquire the public key P_1 of the first communication unit 1a. The security processor 21 then uses the public key P_1 of the first communication unit 1a thus obtained to verify the entrust public key certificate Cert(d_1, P_x) issued by the first unit 1a so as to check on whether the entrust public key P_x is certified by the unit 1a (step S107).

The operation then goes to step S108, in which the security processor 21 uses the obtained entrust public key P_x and the secret key d_2 of the second communication unit 2 to generate a common key K=d_2•P_x=d_2•d_x•G∈G1 according to any common key cryptographic algorithms. The common key cryptographic algorithm to be used may be defined based on a public key cryptographic algorithm used for the delegation information 7.

In the process A103 of notification of processing result, the security processing proxy 32 of the proxy server 3 supplies the security processing result notifier 33 with the generated common key K=d_x•P_2=d_x•d_2•G∈G1 and the identification ID_2 of the other party with which a key is to be exchanged, namely the second communication unit 2 in this example.

The security processing result notifier 33 uses the common key K=d_x•P_2=d_x•d_2•G∈G1 and the identification ID_2 of the second communication unit 2 to generate security processing result notifying information 39. The notifier 33 then sends the security processing result notifying information 39 to the first communication unit 1 by means of the transmitter 34 (step S109).

In the first communication unit 1a, the security processing result notifier 13 receives via the receiver 15 the security processing result notifying information 17, and derives from the notifying information 17 the common key K=d_x•P_2=d_x•d_2•G∈G1 and the identification ID_2 of the other party, or second communication unit 2.

In this way, the proxy server 3 proceeds to the key exchange with the second communication unit 2 on behalf of the first communication unit 1a, and ever since then will intervene in the communication between the first and second communication units 1a and 2.

Figure 6:
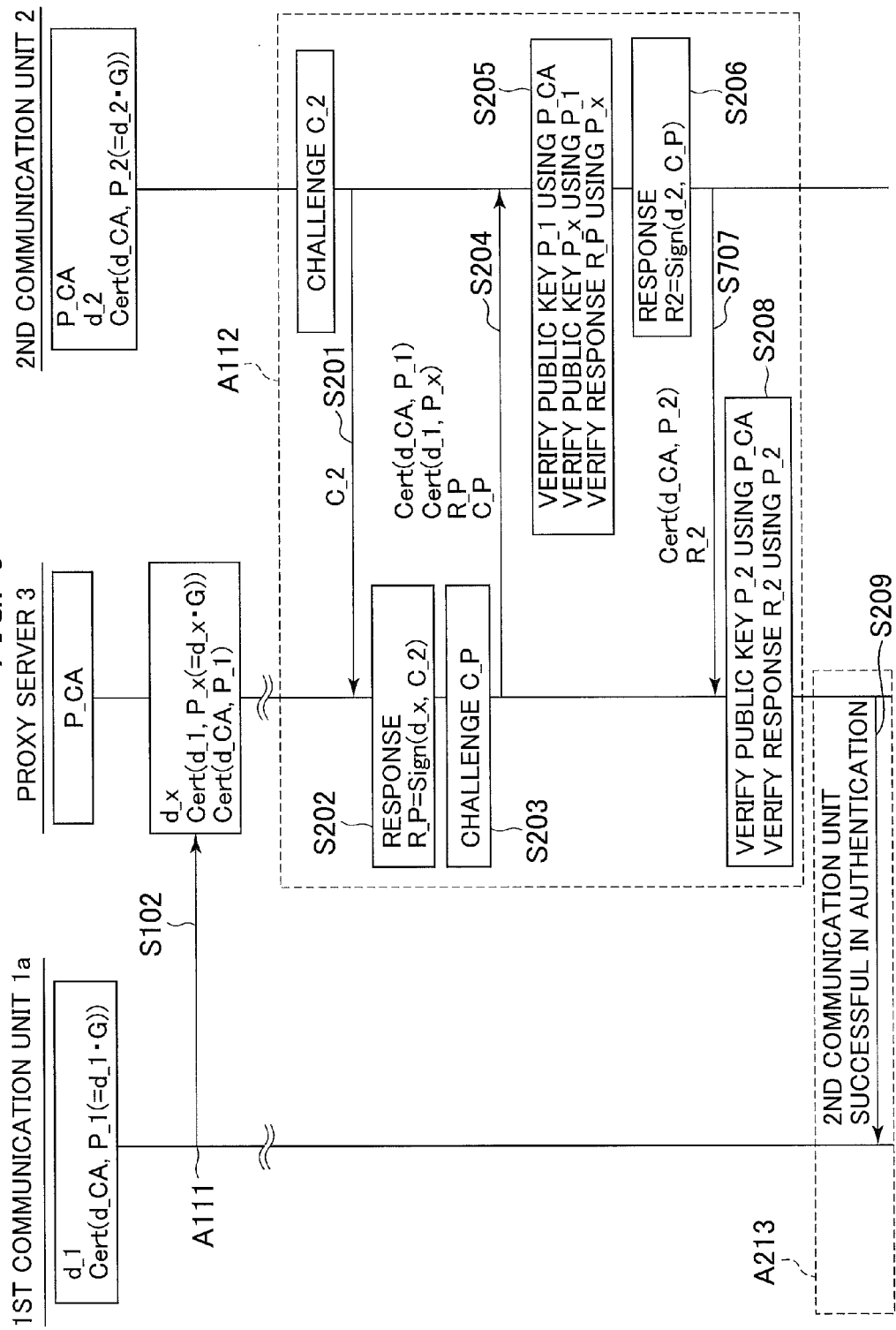
FIG. 6 is a sequence chart useful for understanding the proxy operation of authentication by the PGP encryption of the preferred embodiment.

FIG. 6 is a sequence chart for use in describing the operation of the authentication processing proxy using the PGP encryption in the preferred embodiment.

In the process A111 of authorizing proxy, where the proxy server 3 is authorized to be proxy for the first communication unit 1a by means of the PGP encryption, the authentication processing will proceed similarly to the process A101 of authorizing proxy as described with reference to FIG. 5. Thus, a repetitive description will be avoided about how the first communication unit 1a authorizes the proxy server 3.

Now, description will be made on the process A112 of authenticating proxy exemplarily based on a challenge/response authentication method. The authentication proxy is started when the proxy server 3 sends an authentication request for starting the authentication to the second communication unit 2. In the second communication unit 2, upon receipt of the authentication request from the proxy server 3, the security processor 21 produces first challenge information C_2 including a sequence of random numbers for authenticating the proxy server 3. The transmitter 22 of the second communication unit 2 in turn transmits the first challenge information C_2 to the proxy server 3 (step S201).

The security processing proxy 32 of the proxy server 3 receives the first challenge information C_2 through the receiver 35. In response to the challenge information C_2, the security processing proxy 32 then generates first response information R_P=Sign(d_x, C_2) including a sequence of random numbers by using the entrust secret key d_x given by the first communication unit 1a (step S202).

In this context, Sign(X, Y) is a signature for Y which is produced by using X. In the illustrative embodiment, an elliptic curve cryptosystem may be used, so that this embodiment can adopt ECDSA (Elliptic Curve Digital Signature Algorithm) as algorithm for generating a digital signature, which may, however, not be restrictive. For instance, the digital signature can be generated by using RSA (Rivest Shamir Adleman) cryptography, or a signature algorithm such as DSA (Digital Signature Algorithm) can be applied.

The security processing proxy 32 subsequently produces second challenge information C_P containing a sequence of random numbers for authenticating the second communication unit 2 (step S203).

The security processing proxy 32 then sends to the second communication unit 2 through the transmitter 34 the first response information R_P=Sign(d_x, C_2) thus generated, the second challenge information C_P, the public key certificate Cert(d_CA, P_1) of the first communication unit 1a and the entrust public key certificate Cert(d_1, P_x) generated by the first communication unit 1a (step S204).

The second communication unit 2 receives the public key certificate Cert (d_CA, P_1) of the first communication unit 1a, the entrust public key certificate Cert(d_1, P_x) generated by the first communication unit 1, the first response information R_P and the second challenge information C_P by means of the security processor 21 via the receiver 23.

The security processor 21 verifies the public key certificate Cert(d_CA, P_1) of the first communication unit 1a by using the certification authority public key P_CA of the certification authority CA so as to acquire the public key P_1 of the first communication unit 1a.

The security processor 21 uses the acquired public key P_1 of the first communication unit 1a to verify the entrust public key certificate Cert(d_1, P_x) generated by the first communication unit 1a. If the entrust public key P_x is confirmed as being certified by the first unit 1a, then the security processor 21 acquires the entrust public key P_x. The security processor 21 uses the entrust public key P_x thus acquired to check on whether or not the response information R_P is produced in response to the first challenge information C_2 generated by itself by using the entrust secret key d_x which makes a pair with the entrust public key P_x (step S205).

In the following step S206, the security processor 21 produces second response information R_2=Sign(d_2, C_P) in response to the second challenge information C_P by using the secret key d_2 of the second communication unit 2.

The security processor 21 transmits the second response information R_2 thus produced and its own public key certificate Cert(d_CA, P_2) through the transmitter 22 to the proxy server 3 (step S207).

In the proxy server 3, the security processing proxy 32 receives, on behalf of the first communication unit 1a, the second response information R_2 and the public key certificate Cert(d_CA, P_2) of the second communication unit 2 via the receiver 35.

The security processing proxy 32 verifies the public key certificate Cert(d_CA, P_2) of the second communication unit 2 by using the certification authority public key P_CA of the certification authority CA to thereby acquire the public key P_2 of the second unit 2. The proxy 32 then uses the obtained public key P_2 of the second communication unit 2 to check on whether or not the second response information R_2 is one which the second communication unit 2 produced by means of the secret key d_2 of itself in response to the second challenge information C_P the proxy 32 produced (step S208).

In the process A113 of notification of processing result in the proxy server 3, the security processing proxy 32 supplies the security processing result notifier 33 with the identification ID_2 of the second communication unit 2 and its authentication result.

The security processing result notifier 33 in turn generates security processing result notifying information 39 based on the supplied identification ID_2 of the second communication unit 2 and its authentication result. The security processing result notifier 33 transmits the security processing result notifying information through the transmitter 34 to the first communication unit 1 (step S209).

In the first communication unit 1, the security processing result notifier 13 receives the security processing result notifying information 17 via the receiver 15, and drives therefrom the identification ID_2 of the second communication unit 2 and its authentication result. In this way, the proxy server 3 executed the authentication with the second communication unit 2 on behalf of the first communication unit 1a.

An example of proxy operation of encrypted communication path establishment by using the PGP encryption will be described with reference to FIG. 7, which is a sequence chart useful for understanding such a proxy operation applying the PGP encryption in accordance with the preferred embodiment.

Figure 7:
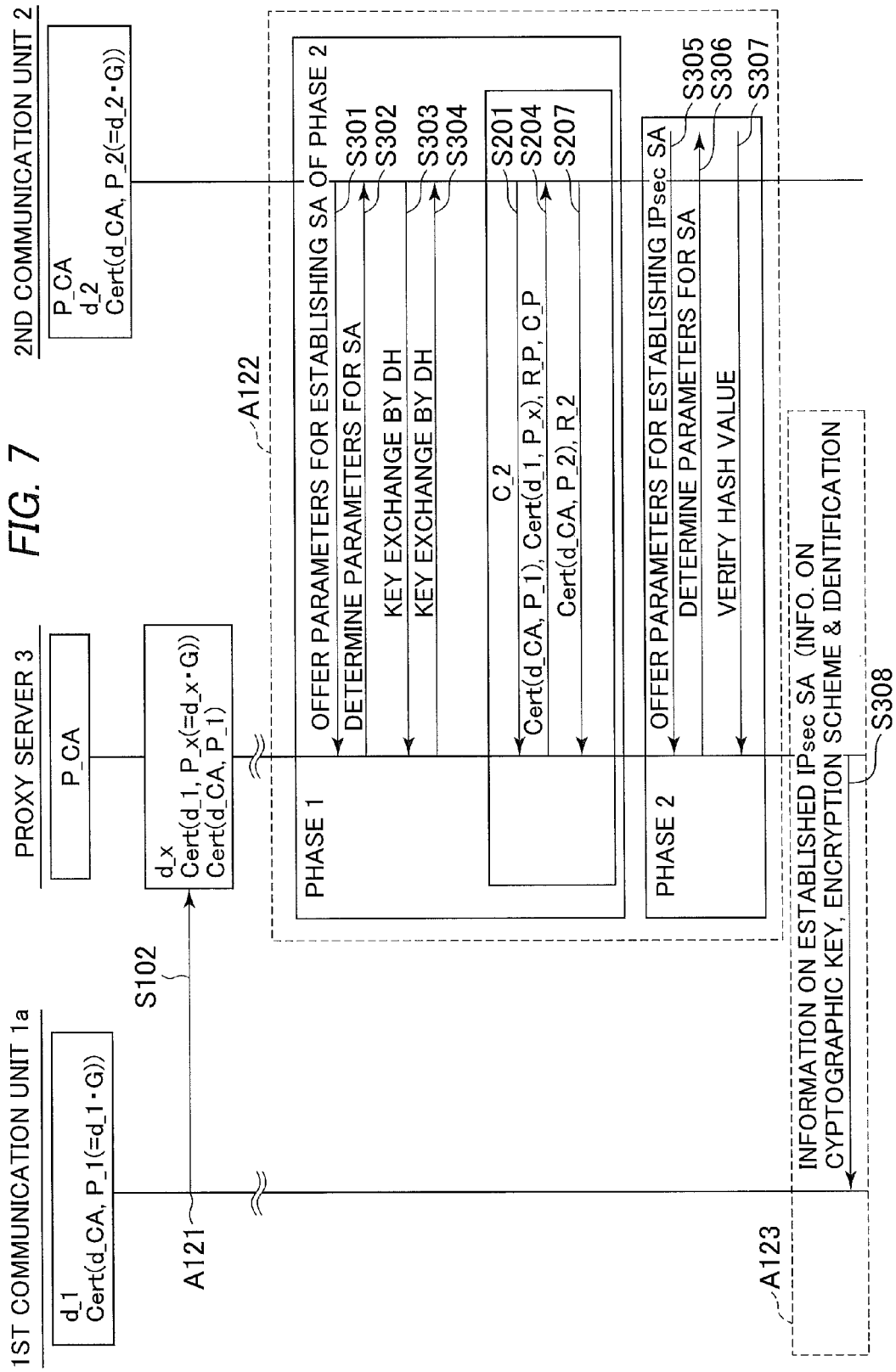
FIG. 7 is a sequence chart useful for understanding the proxy operation of encrypted communication path establishment by the PGP encryption of the preferred embodiment.

FIG. 7 is directed to the encrypted communication path establishment in IPsec (Internet Protocol Security) uses IKE (Internet Key Exchange) for a key exchange protocol.

According to the present invention, the encrypted communication path establishment is based on a concept that the parameters for a cryptographic algorithm, an encryption scheme and the like which are required to establish an encrypted communication path are made consistent between the proxy server 3 and the second communication unit 2, and, in addition to that, the operations, such as authentication and authenticated key exchange, which require the secret key of the first communication unit 1a are performed by the proxy server 3 without acquiring such a secret key.

IPsec consists of two phases. That is, Phase 1 establishes SA (Security Association) for securing an information exchange in Phase 2, and Phase 2 establishes another SA for securing actual communications.

In IKE, a key exchange is conducted to generate a cryptographic key, but is not required to be authenticated by the first communication unit 1 because the key exchange is performed with the DH (Diffie-Hellman) key exchange scheme which does not involve an authentication function.

The following description presents an example of the authentication of Phase 1, which requires authorization of the first communication unit 1a, in which the proxy server 3 performs the authentication on behalf of the first communication unit 1a. The operation of authentication carried out by the proxy server 3 may be similar to the operation of the process A112 of authenticating proxy described with reference to FIG. 6.

In the process A121 of authorization of proxy, since the operation of authorization of proxy for the proxy server 3 by the first communication unit 1a may be similar to the operation in the process A101 of authorization of proxy described with reference to FIG. 5, repetitive description about it will be refrained from.

The process A122 of proxy establishment of an encrypted communication path is intended for rendering consistent the parameters for sharing a common key, authentication, a cryptographic algorithm and an encryption scheme which are required to establish an encrypted communication path between the proxy server 3 and the second communication unit 2.

More specifically, the encrypted communication path establishment is started when the proxy server 3 sends to a request for starting encrypted communication path establishment the second communication unit 2. Upon receipt of the establishment request, the second communication unit 2 offers the parameters for establishing an SA of Phase 2 to the proxy server 3 (step S301). The proxy server 3 determines the parameters for the SA, e.g. a cryptographic key, an encryption scheme and an identification, to supply the parameters to the second communication unit 2 (step S302). The operation will proceed in the following steps, in which a common key needed to establish the encrypted communication path is exchanged between the second communication unit 2 and the proxy server 3 (steps S303 and S304). With regard to the authentication which requires the operations using the secret key of the first communication unit 1a, namely Phase 1, the proxy server 3 can proceed to the operations without acquiring secret information. This authentication proxy conducted by the proxy server 3 may be similar to the operation in the process A112 of authentication proxy described with reference to FIG. 6, and therefore repeated description about it will be avoided.

In Phase 2, between the proxy server 3 and the second communication unit 2, the consistency of the key, cryptographic algorithm, encryption scheme and others for securing actual communications is maintained so as to establish the IPsec SA.

More specifically, the establishment of the IPsec SA is accomplished in such a way that the second communication unit 2 offers the proxy server 3 the parameters for the IPsec SA, e.g. a cryptographic key, an encryption scheme and an identification (step S305). The proxy server 3 in turn determines the parameters for the SA and sends the parameters to the second communication unit 2 (step S306). Then, the second communication unit 2 verifies a hash value between the unit 2 and the proxy server 3 to thereby establish the IPsec SA (step S307).

In the process A123 of notification of processing result, the security processing proxy 32 of the proxy server 3 supplies the security processing result notifier 33 with information 38 on the IPsec SA established between the proxy server 3 and the second communication unit 2, i.e. information about the cryptographic key, encryption scheme and identification (step S308).

The security processing result notifier 33 uses the supplied IPsec SA information to produce security processing result notifying information 39, and transmits the generated information 39 to the first communication unit 1a through the transmitter 34.

The first communication unit 1a receives the security processing result notifying information 13 by means of the security processing result notifier 13 via the receiver 15, thereby obtaining the IPsec SA necessary to establish end-to-end encrypted communications with the second communication unit 2.

An example of the proxy operation of key exchange by means of a certification authority will be described with reference to FIG. 8, which is a sequence chart for use in describing such an operation in accordance with the preferred embodiment.

In the process B101 of authorization of proxy, the delegation information generator 11 of the first communication unit 1a uses appropriate one of the common key cryptographic algorithms to figure out a point $F(ID\_P) \in G2$ on an elliptic curve, which is associated with the identification ID_P of the proxy server 3. The delegation information generator 11 then uses the own secret key d_1 of the first unit 1a to generates an entrust secret key $SK\_P = d\_1 \cdot F(ID\_P) \in G2$ to be entrusted to the proxy server 3 (step S401). The latter key may simply be represented by entrust secret key SL_P.

The delegation information notifier 12 in turn generates a delegation information signal 16 for notifying the proxy server 3 about the entrust secret key SK_P and the public key certificate Cert(d_CA, P_1) of the first communication unit 1a. The delegation information notifier 12 sends the delegation information signal 16 through the transmitter 14 toward the proxy server 3 (step S402).

In the proxy server 3, the delegation information acquirer 31 receives the delegation information signal 16 via the receiver 35 to derive the delegation information 7 from the signal 16. The delegation information acquirer 31 also derives the entrust secret key SK_P and the public key certificate Cert(d_CA, P_1) of the first communication unit 1a.

The delegation information acquirer 31 supplies the acquired delegation information 7 to the security processing proxy 32.

The process B102 of key exchange proxy is started between the proxy server 3 and the second communication unit 2 when the proxy server 3 receives a key exchange request for starting a key exchange from the first communication unit 1a.

Then, the second communication unit 2 receives the key exchange request from the proxy server 3, and in response to the request, sends the public key certificate Cert(d_CA, P_2) of the second unit 2 to the proxy server 3 (step S403).

The proxy server 3 receives, on behalf of the first communication unit 1, the public key certificate Cert(d_CA, P_2) of the second unit 2 by means of the security processing proxy 32 through the receiver 35. The security processing proxy 32 uses the certification authority public key P_CA of the certification authority CA to verify the public key certificate Cert(d_CA, P_2) of the second unit 2 so as to obtain the public key P_2 of the second unit 2 (step S404).

Subsequently, the security processing proxy 32 uses the public key P_2 of the second communication unit 2 and the entrust secret key SK_P given by the first communication unit 1a to generate a common key $K = e(P\_2, SK\_P) = e(d\_2 \cdot G, d\_1 \cdot F(ID\_P)) = e(G, F(ID\_P))d1 \cdot d\_2 \in G3$ (step S405).

The security processing proxy 32 then sends through the transmitter 34 to the second communication unit 2 the public key certificate Cert(d_CA, P_1) of the first communication unit 1a given by the first unit 1a and the identification ID_P of the proxy server 3 (step S406).

The security processor 21 in the second communication unit 2 receives through the receiver 23 the public key certificate Cert(d_CA, P_1) of the first communication unit 1*a* and the identification ID_P of the proxy server 3.

The security processor 21 uses the certification authority public key P_CA of the certification authority CA to verify the public key certificate Cert(d_CA, P_1) of the first communication unit 1*a* to thereby acquire the public key P_1 of the first unit 1*a* (step S407).

The security processor 21 then calculates the point F(ID_P)∈G2 on an elliptic curve, which is associated with the identification ID_P of the proxy server 3, and in turn, uses the F(ID_P), acquired public key P_x and the secret key d_2 of the second communication unit 2 to generate a common key K=e(d_2•P_1, F(ID_P))=e(d_2•d_1•G, F(ID_P))=e(G, F(ID_P))d_1•d_2∈G3 (step S408).

The process B103 of notifying the above processing result may be similar to the operation A103 of notification of processing result described with reference to FIG. 5, and therefore description about it will be repeated.

An example of proxy operation of authentication by means of a certification authority will be described with reference to FIG. 9, which is a sequence chart useful for understanding such an operation according to the preferred embodiment.

In this context, k_P is a random number, H1 is a hush function, H2 is a function for converting a point on the elliptic curve included in the cyclic group G1 into an integral value.

The process B111 of authorization of proxy to the proxy server 3 by the first communication unit 1*a* may be similar to the operation B101 of authorization of proxy described with reference to FIG. 8, and thus repetitive description about it will be avoided.

The process B112 of authentication proxy will be described by taking the challenge/response authentication method as an example. The authentication proxy process is started when the proxy server 3 sends an authentication request for starting the authentication processing to the second communication unit 2.

Upon receipt of the authentication request from the proxy server 3, the security processor 21 of the second communication unit 2 produces first challenge information C_2 having a sequence of random numbers as challenge information for authenticating the proxy server 3. The second communication unit 2 then sends the first challenge information C_2 via the transmitter 22 to the proxy server 3 (step S501).

The security processing proxy 32 of the proxy server 3 receives the first challenge information C_2 through the receiver 35.

The security processing proxy 32 uses the entrust secret key SK_P given in trust by the first communication unit 1*a* to produce first response information σ_P=(R_P, S_P) having a sequence of random numbers in response to the first challenge information C_2, (step S502). The first response information may simply be represented by first response information σ_P. There are established the relationships, R_P=k_P•G∈G1, and S_P=k_P−1•{H1(C_2)•F(ID_P)+H2(R_P)•SK_P}∈G2.

Subsequently, the security processing proxy 32 produces second challenge information C_P having a sequence of random numbers as challenge information for authenticating the second communication unit 2 (step S503).

The security processing proxy 32 sends to the second communication unit 2 by means of the transmitter 34 the first response information σ_P, the second challenge information C_P, the public key certificate Cert(d_CA, P_1) of the first communication unit 1*a* and the identification ID_P of the proxy server 3 (step S504).

In the second communication unit 2, the security processor 21 receives via the receiver 23 the public key certificate Cert(d_CA, P_1) of the first communication unit 1*a*, the identification ID_P of the proxy server 3, the first response information σ_P and the second challenge information C_P.

The security processor 21 verifies the public key certificate Cert(d_CA, P_1) of the first communication unit 1*a* by using the certification authority public key P_CA of the certification authority CA to acquire the public key P_1 of the first unit 1*a*.

The security processor 21 then figures out a result e1 from the pairing operation between two parameters R_P and S_P of the first response information σ_P.

The security processor 21 also figures out another result e2 from the pairing operation by using the public key P_1 of the first communication unit 1*a*, the identification ID_P of the proxy server 3, the first challenge information C_2 generated by itself and the parameter R_P of the first response information σ_P.

The security processor 21 then confirms whether or not the pairing operation results e1 and e2 are equivalent to each other (step S505). In other words, when the pairing operation result e1 is consistent with the result e2, the security processor 21 is successful in confirming that the first response information was generated in response to the first challenge information C_2 by means of the entrust secret key SK_P given in trust from the first communication unit 1*a*.

The pairing operation result e1 is obtained by the following formulae:

$$e1 = e(R\_P, S\_P) \quad (1)$$
$$= e\left(k\_P \cdot G, k\_P-1\left\{\begin{array}{l}H1(C\_2) \cdot F(ID\_P) + \\ H2(R\_P) \cdot SK\_P\end{array}\right\}\right)$$
$$= e(k\_P \cdot G, k\_P-1 \cdot H1(C\_2) \cdot F(ID\_P)) \cdot$$
$$e(k\_P \cdot G, k\_P-1 \cdot H2(R\_P) \cdot SK\_P)$$
$$= e(G, F(ID\_P))H1(C\_2) + d\_1 \cdot H2(R\_P) \in G3$$

The pairing operation result e2 is obtained by the following formulae:

$$e2 = e(G, F(ID\_P))H1(C\_P) \cdot e(P\_1, F(ID\_P))H2(R\_P) \quad (2)$$
$$= e(G, F(ID\_P))H1(C\_P) \cdot e(d\_1 \cdot G, F(ID\_P))H2(R\_P)$$
$$= e(G, F(ID\_P))H1(C\_2) + d\_1 \cdot H2(R\_P) \in G3$$

The security processor 21 subsequently produces second response information R_2=Sign(d_2, C_P) for the first challenge information C_2 by using the secret key d_2 of the second communication unit 2 (step S506).

The security processor 21 transmits the produced second response information R_2 as well as the public key certificate Cert(d_CA, P_2) of the second unit 2 to the proxy server 3 through the transmitter 22 (step S507).

The security processing proxy 32 of the proxy server 3 receives through the receiver 35 the second response information R_2 and the public key certificate Cert(d_CA, P_2) sent from the second communication unit 2.

The security processing proxy 32 verifies the public key certificate Cert(d_CA, P_2) based on the certification authority public key P_CA of the certification authority CA to obtain the public key P_2 of the second communication unit 2. The proxy 32 uses the obtained public key P_2 of the second communication unit 2 to check on whether or not the second response information R_2 was generated by means of the secret key d_2 of the second unit 2 in response to the second challenge information C_P generated by itself (step S508).

The process B113 of notifying a processing result may be similar to the operation B103 of notifying processing result described with reference to FIG. 8, and thus description about it will be repeated.

An example of proxy operation of encrypted communication establishment by means of a certification authority will be described. The proxy operation of encrypted communication establishment by using a certification authority may be similar to the operation of encrypted communication establishment proxy using the PGP encryption illustrated in FIG. 7.

More specifically, in the encrypted communication path establishment, the parameters for a cryptographic algorithm and an encryption scheme which are required to establish an encrypted communication path are rendered consistent between the proxy server 3 and the second communication unit 2, and, in addition to that, the proxy server 3 performs the proxy operation, such as authentication and authenticated key exchange that require the secret key of the first communication unit 1a, without acquiring such a secret key.

C. Alternative Preferred Embodiment

Now, an alternative, or second, embodiment of the security processing proxy system in accordance with the present invention will be described in detail further with reference to the accompanying drawings. The second embodiment may be applied to the telecommunications network system 5 shown in FIG. 1. Furthermore, the second embodiment is also applicable to the first communication units 1, the second communication unit 2 and the proxy server 3 having the internal structures shown in FIGS. 2, 3 and 4 and described in connection with the first embodiment. However, the operation of those system components in the alternative embodiment may differ from the first embodiment.

With reference to FIG. 2, the first communication units 1 of the second embodiment may be different from the first embodiment in the operation of the delegation information generator 11. The delegation information generator 11 may operate basically in the same manner as the first embodiment except for the delegation information to be left to the proxy server 3 in the PGP encryption.

More specifically, it may be recalled that the delegation information generator 11 of the first embodiment generates a pair of keys according to a key cryptography, i.e. a pair of entrust public key P_x and entrust secret key d_x, and supplies the delegation information notifier 12 with the entrust secret key d_x as well as an entrust public key certificate Cert(d_1, P_x), which is generated for the entrust public key P_x by attaching a signature with the secret key d_1 of a first communication unit 1.

In contrast to this, the delegation information generator 11 of the second embodiment is configured to generate an entrust public key certificate Cert(d_1, P_P) by attaching a signature with the secret key d_1 of a first communication unit 1 in relation to the public key P_P of the proxy server 3 so as to provide the generated certificate to the delegation information notifier 12.

In order to generate a public key certificate for the public key P_P of the proxy server 3, the delegation information generator 11 may comprise means for using the public key P_CA of a certification authority CA to derive the public key P_P of the proxy server 3 from the public key certificate Cert(d_CA, P_P) provided by the proxy server.

The delegation information generator 11 also receives the public key certificate Cert(d_CA, P_P) from the transmitter 14 to check the validity of the public key P_P of the proxy server 3 by using the public key P_CA of the certification authority CA. In addition to that, the delegation information generator 11 may attach a signature with the public key P_P thus confirmed as valid or attach a signature to the public key certificate Cert(d_CA, P_P) with its own secret key d_1 to thereby generate a public key certificate Cert(d_1, P_P) for the public key P_P of the proxy server 3.

In FIG. 3, the proxy server 3 of the second embodiment may differ from that of the first embodiment in the operations carried out by the delegation information acquirer 31 and the security processing proxy 32.

The delegation information acquirer 31 may almost be the same as the first embodiment except for delegation information trusted by the first communication units 1.

As described before, the delegation information acquirer 31 of the first embodiment acquires the public key certificate Cert(d_1, P_x) of the proxy server 3 issued by a first communication unit 1 and the entrust secret key d_x which pairs off with the public key P_x so as to supply them to the security processing proxy 32.

In contrast to this, the delegation information acquirer 31 of the second embodiment is configured to acquire the entrust public key certificate Cert(d_1, P_P) to which a first communication unit 1 has attached a signature in relation to the public key P_P of the proxy server 3, the certificate thus being supplied to the security processing proxy 32.

In order to acquire a signature from the first communication unit 1 for the public key P_P of the proxy server 3, the delegation information acquirer 31 may supply the transmitter 34 with the public key P_P 3 or the public key certificate Cert(d_CA, P_P) of the proxy server 3.

In the instant alternative embodiment, the security processing proxy 32 may be adapted, as with the first embodiment, to perform the security processing between the first and second communication units 1 and 2 on behalf of the first communication units 1.

The description on how the security processing proxy 32 carries out security processing by using the PGP encryption and a certification authority will be made later in connection with the operations of security processing.

In the second embodiment, the second communication unit 2, FIG. 4, may be different from the first embodiment in the operation of the security processor 21. The security processor 21 is adapted for conducting the security processing with other communication units in the same way as the first embodiment, but may be different from the first embodiment in that the public key P_P of the proxy server 3 is also used for the security processing.

The description on how the security processor 21 carries out security process by using the PGP encryption and a certification authority will be made later in connection with the description on the operations of security processing.

Now, detailed description on the operations of the security processing proxy system according to the second embodiment will be made by referring FIGS. 10 to 13. In this description, the proxy server 3 holds its own public key certificate Cert(d_CA, P_P(=d_P•G∈G1)) issued by a certification authority CA and a secret key d_P which is associated with the public key P_P of the proxy server.

In the second embodiment, the description will be made about the security processing, which includes key exchange and authentication, by using the PGP encryption and a certification authority with emphasis added on the matters different from the first embodiment.

Description on the encrypted communication path establishment is omitted. It is however noted that as with the first embodiment the proxy server 3 is allowed to execute the proxy operations, such as authentication and authenticated key exchange, which would otherwise require the secret key of the first communication units 1, without acquiring such a secret key.

Figure 10:
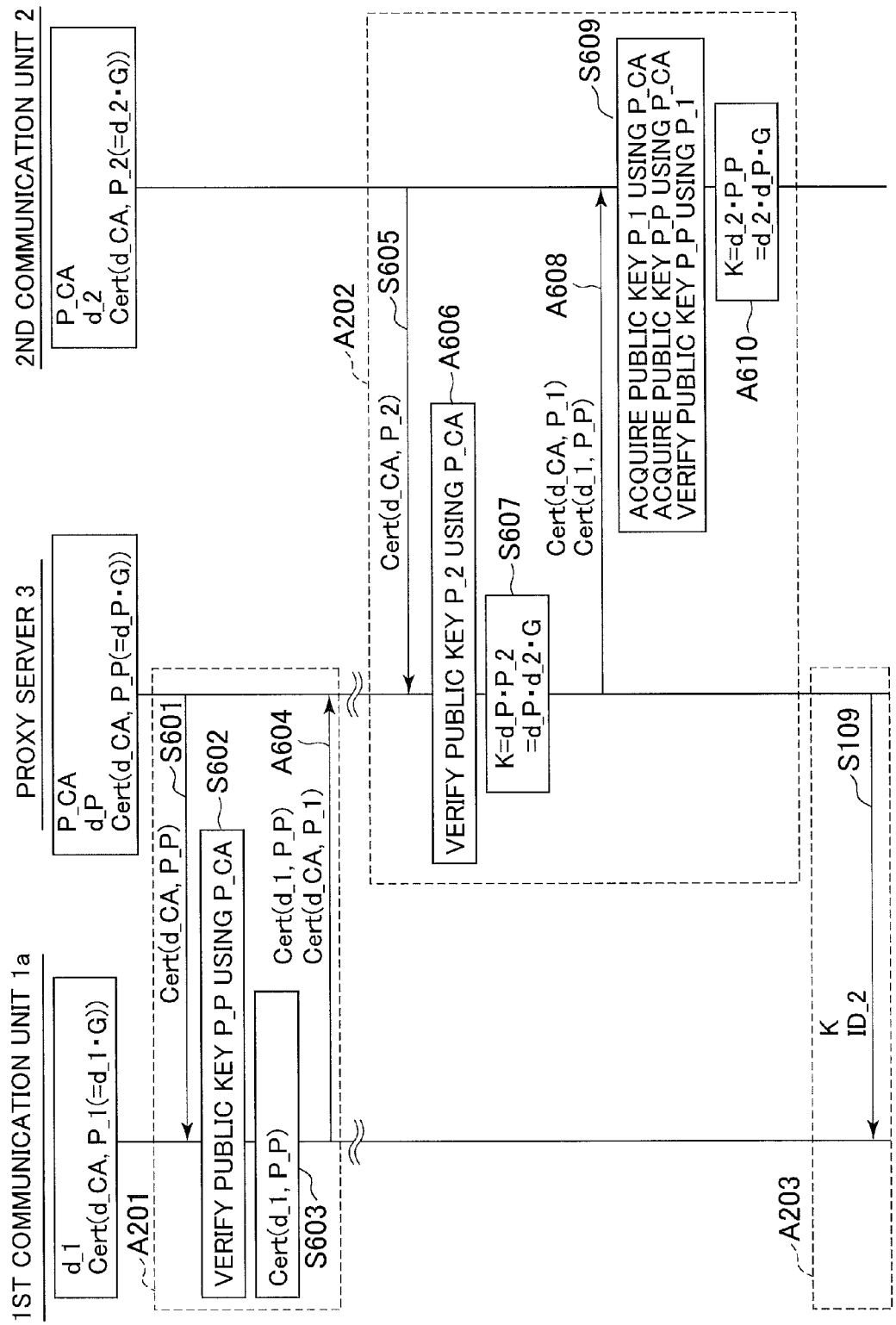
FIG. 10 is a sequence chart, like FIG. 5, useful for understanding the proxy operation of key exchange by the PGP encryption of an alternative preferred embodiment.

An example of proxy operation of key exchange by using the PGP encryption will be described with reference to FIG. 10, which is a sequence chart for use in describing such an operation according to the alternative embodiment.

In the process A201 of authorizing proxy, a first communication unit 1a holds the public key P_P of the proxy server 3 acquired beforehand from the proxy server 3.

The public key P_P of the proxy server 3 is acquired in such a manner that the first communication unit 1a acquires from the proxy server 3 the public key certificate Cert (d_CA, P_P) of the proxy server 3 (step S601), and then verifies the acquired public key certificate Cert(d_CA, P_P) by using the aforementioned certification authority public key P_CA (step S602).

In the first communication unit 1a, the delegation information generator 11 generates an entrust public key certificate Cert(d_1, P_P(=d_P•G∈G1)) by attaching a signature to the public key P_P of the proxy server 3 with the secret key d_1 of the first communication unit 1a (step S603).

The delegation information generator 11 generates delegation information 7 on the entrust public key certificate Cert(d_1, P_P) and the public key certificate Cert(d_CA, P_1) of the first communication unit 1a to be sent to the proxy server 3, and supplies the generated information 7 to the delegation information notifier 12. The delegation information notifier 12 in turn generates a delegation information signal 16 for notifying the proxy server 3 of the delegation information 7, and transmits the generated signal 16 by means of the transmitter 14 to the proxy server 3 (step S604).

In the process A202 of key exchange proxy, the key exchange processing is started when the proxy server 3 receives a key exchange request for starting the key exchange from the first communication unit 1a. Then, the second communication unit 2 receives from the proxy server 3 the key exchange request and in turn sends back the public key certificate Cert(d_CA, P_2) of the second unit 2 to the proxy server 3 (step S605). The proxy server 3 receives the public key certificate Cert(d_CA, P_2) of the second communication unit 2 on behalf of the first communication unit 1a by means of the security processing proxy 32 through the receiver 35. The security processing proxy 32 verifies the public key certificate Cert(d_CA, P_2) of the second unit 2 based on the certification authority public key P_CA of the certification authority CA to thereby derive the public key P_2 of the second unit 2 (step S606). In the following step S607, the proxy 32 uses the public key P_2 of the second communication unit 2 and the secret key d_P of the proxy server 3 to generate a common key K=d_P•P_2=d_P•d_2•G∈G1 according to appropriate one of the common key cryptographic algorithms.

Subsequently, the security processing proxy 32 transmits via the transmitter 34 to second communication unit 2 the public key certificate Cert(d_CA, P_1) of the first communication unit 1a given in trust from the first unit 1a, the entrust public key certificate Cert(d_1, P_P) issued for the public key P_P of the proxy server 3 by the first unit 1a and the public key certificate Cert(d_1, P_P) of the proxy server 3 (step S608).

In the second communication unit 2, the security processor 21 in turn verifies the received public key certificate Cert(d_CA, P_1) of the first communication unit 1a and the public key certificate Cert(d_1, P_P) of the proxy server 3 by using the certification authority public key P_CA of the certification authority CA so as to derive the public key P_1 of the first communication unit 1a and the public key P_P of the proxy server 3 (step S609).

The security processor 21 then uses the derived public key P_1 of the first communication unit 1a to verify the public key certificate Cert(d_1, P_P) of the proxy server 3, thereby confirming that the public key P_P of the proxy server 3 is certified by the first communication unit 1a. Subsequently, the security processor 21 uses the public key P_P of the proxy 3 and the secret key d_2 of the second communication unit 2 to produce a common key K=d_2•P_P=d_2•d_P•G∈G1 according to an appropriate common key cryptographic algorithm (step S610). The common key cryptographic algorithm may be selected according to the public key cryptographic algorithm used for the delegation information 7.

The process A203 of notifying a proceeding result may be similar to the operation A103 of notifying a processing result" described with reference to FIG. 5, and will therefore not repetitively be described.

Figure 11:
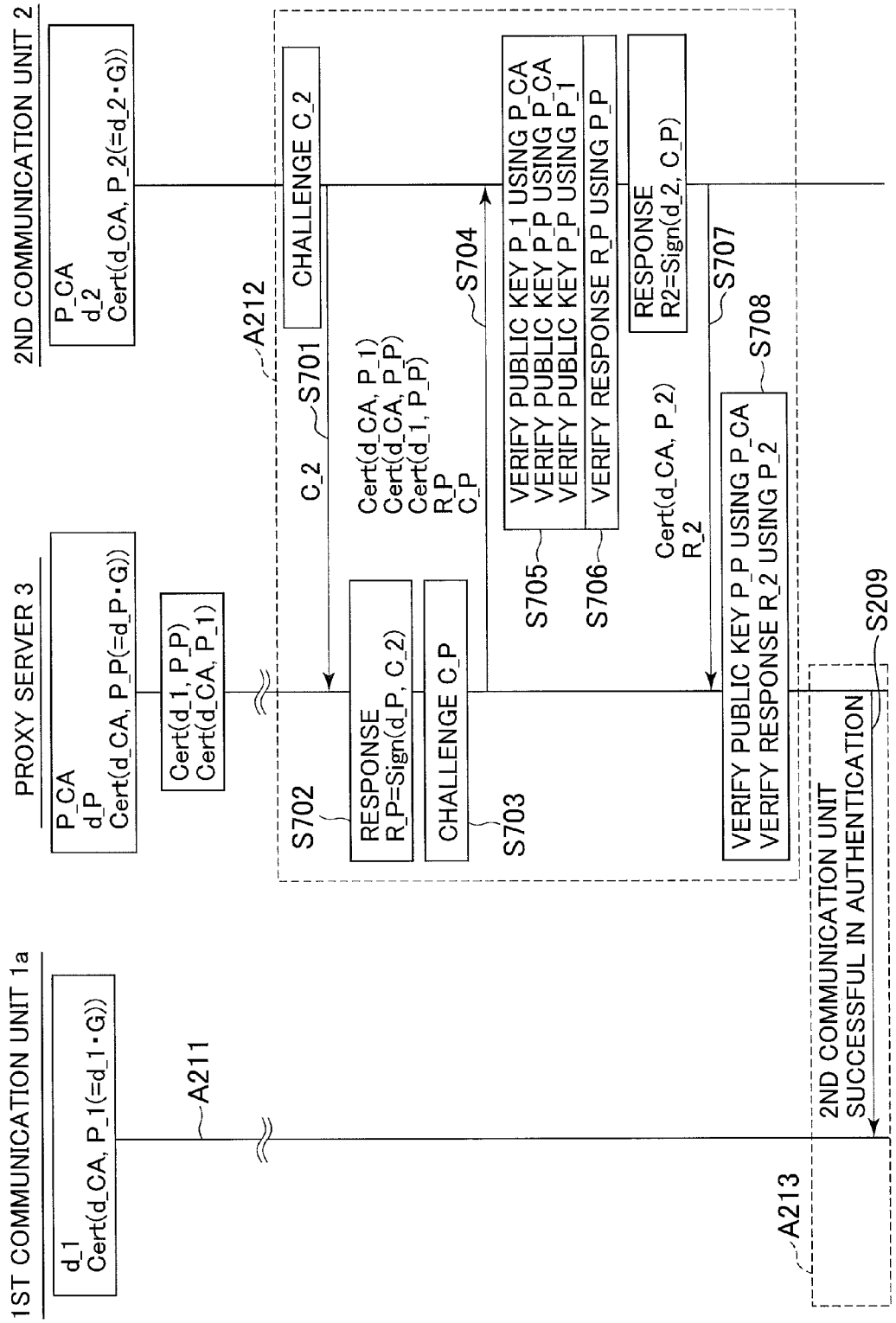
FIG. 11 is a sequence chart, like FIG. 6, useful for understanding the proxy operation of authentication by the PGP encryption of the alternative preferred embodiment.

An example of proxy operation of authentication by the PGP encryption will be described with reference to FIG. 11, which is a sequence chart useful for understanding such an operation according to the second preferred embodiment.

The process A211 of authorizing proxy for the proxy server 3 by the first communication unit 1a may be similar to the operation A101 of authorizing proxy described with reference to FIG. 5, and will not repetitively be described.

Now, the description will be made on the proxy process A212 of authentication based on the challenge/response authentication method. The authentication processing is started when the proxy server 3 sends to the second communication unit 2 an authentication request for starting the authentication. Upon receipt of the authentication request from the proxy server 3 in the second communication unit 2, the security processor 21 produces first challenge information C_2 having a sequence of random numbers for authenticating the proxy server 3. The transmitter 22 of the second communication unit 2 in turn transmits the first challenge information C_2 to the proxy server 3. The security processing proxy 32 of the proxy server 3 receives the first challenge information C_2 through the receiver 35 (step S701). In response to the challenge information C_2, the security processing proxy 32 then generates first response information R_P=Sign(d_P, C_2) having a sequence of random numbers by using the secret key d_P of the proxy server 3 (step S702). The security processing proxy 32 subsequently produces second challenge information C_P having a sequence of random numbers for authenticating the second communication unit 2 (step S703).

The security processing proxy 32 then sends to the second communication unit 2 through the transmitter 34 the first response information R_P and the second challenge information C_P generated as above, the public key certificate Cert(d_CA, P_1) of the first communication unit 1*a*, and the entrust public key certificate Cert(d_1, P_P) generated by the first communication unit 1 (step S704).

In the second communication unit 2, the security processor 21 uses the certification authority public key P_CA of the certificate authority CA to verify the public key certificate Cert(d_1, P_P) of the first communication unit 1*a* and the public key certificate Cert(d_CA, P_P) of the proxy server 3, thereby deriving the public key P_1 of the first communication unit 1*a* and the public key P_P of the proxy server 3. The security processor 21 uses the derived public key P_1 to verify the public key certificate Cert(d_1, P_P) so as to confirm that the public key P_P is certified by the first communication unit 1*a* (step S705).

The security processor 21 then uses the derived public key P_P to confirm whether or not the response information R_P was generated by using the secret key d_P for the challenge information C_2 the processor 21 generated (step S706).

The procedure of successive steps S707 and S708 may be the same as steps S207 and S208 illustrated in FIG. 6, and thus the description thereof will not be repeated.

The process A213 of notifying the processing result may be similar to the operation A113 of notifying a processing result described with reference to FIG. 6, and therefore the repeated description about it is be avoided.

Figure 12:
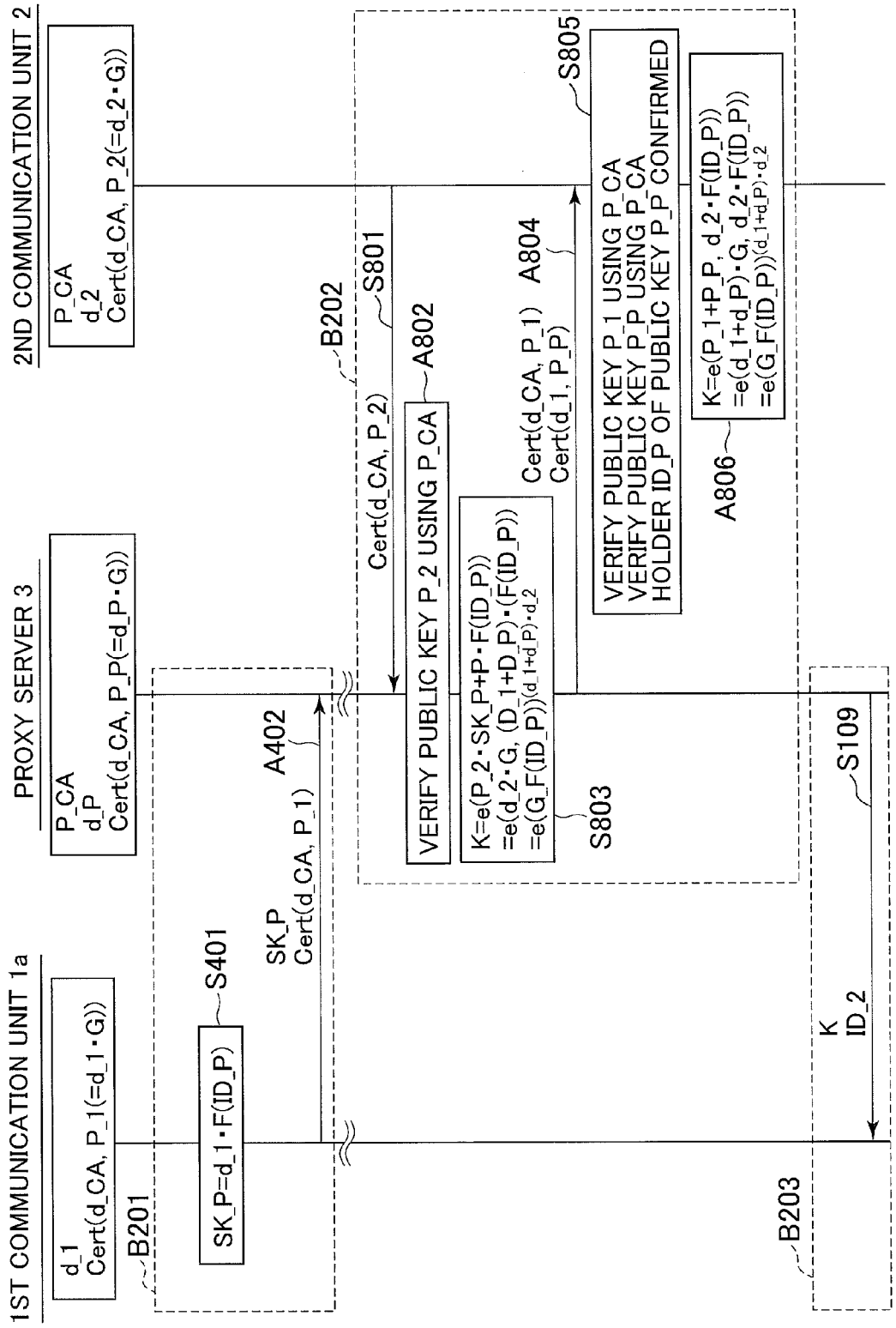
FIG. 12 is a sequence chart, like FIG. 8, useful for understanding the proxy operation of key exchange by means of a certification authority system of the alternative embodiment.

An example of proxy operation of key exchange by means of a certification authority will be described with reference to FIG. 12, which is a sequence chart useful for understanding such an operation according to the second preferred embodiment.

The process B201 of authorizing proxy may be similar to the operation B101 of authorizing proxy described with reference to FIG. 8, and therefore the description about it will be refrained from.

In the process B202 of key exchange proxy, first, the key exchange processing is triggered, not specifically shown, between the proxy server 3 and the second communication unit 2 when the proxy server 3 receives a key exchange request for starting the key exchange from the first communication unit 1*a*. Note that the first two steps S801 and S802 will not be described because both steps may be the same as steps S403 and S404 illustrated in FIG. 8.

In successive step S803, the security processing proxy 32 of the proxy serve 3 uses the public key P_2 of the second communication unit 2, the identification ID_P and the secret key d_P of the proxy server 3, and the entrust secret key SK_P given in trust from the first communication unit 1*a* to generate a common key K=e(P_2, SK_P+d_P•F(ID_P))=e (d_2•G, (d_1+d_P)•F(ID_P))=e(G, F(ID_P))(d_1+d_P) •d_2∈G3.

The security processing proxy 32 then sends the public key certificate Cert(d_CA, P_1) of the first communication unit 1*a* and the public key certificate Cert(d_CA, P_P) of the proxy server 3 through the transmitter 34 to the second communication unit 2 (step S804).

The second communication unit 2 receives the public key certificate Cert(d_CA, P_1) of the first communication unit 1*a* and the public key certificate Cert(d_CA, P_P) of the proxy server 3 by means of the security processor 21 via the receiver 23.

The security processor 21 verifies the public key certificate Cert(d_CA, P_1) of the first communication unit 1*a* and the public key certificate Cert(d_CA, P_P) of the proxy server 3 by using the certification authority public key P_CA of the certification authority CA to thereby derive the public key P_1 of the first communication unit 1*a* and the public key P_P of the proxy server 3. The security processor 21 then checks on whether the identification ID_P of the proxy server 3 is associated with the information tied to the public key P_P of the proxy server 3, which is recorded in the successfully verified public key certificate Cert(d_CA, P_P) of the proxy server 3, and figures out a point F(ID_P)∈G2 on an elliptic curve that is associated with the identification ID_P of the proxy server 3 (step S805).

Subsequently, the security processor 21 uses the point F(ID_P), the public key P_P of the proxy server 3, the public key P_1 of the first communication unit 1*a* and its own secret key d_2 to produce a common key K=e(P_1+P_P, d_2•F(ID_P))=e((d_1+d_P)•G, d_2•F(ID_P))=e(G, F(ID_P))(d_1+d_P)•d_2∈G3 (step S806).

The operation B203 of notifying the processing result may be similar to the operation B103 of notifying a processing result described with reference to FIG. 8, and therefore repeated description about it is avoided.

Figure 13:
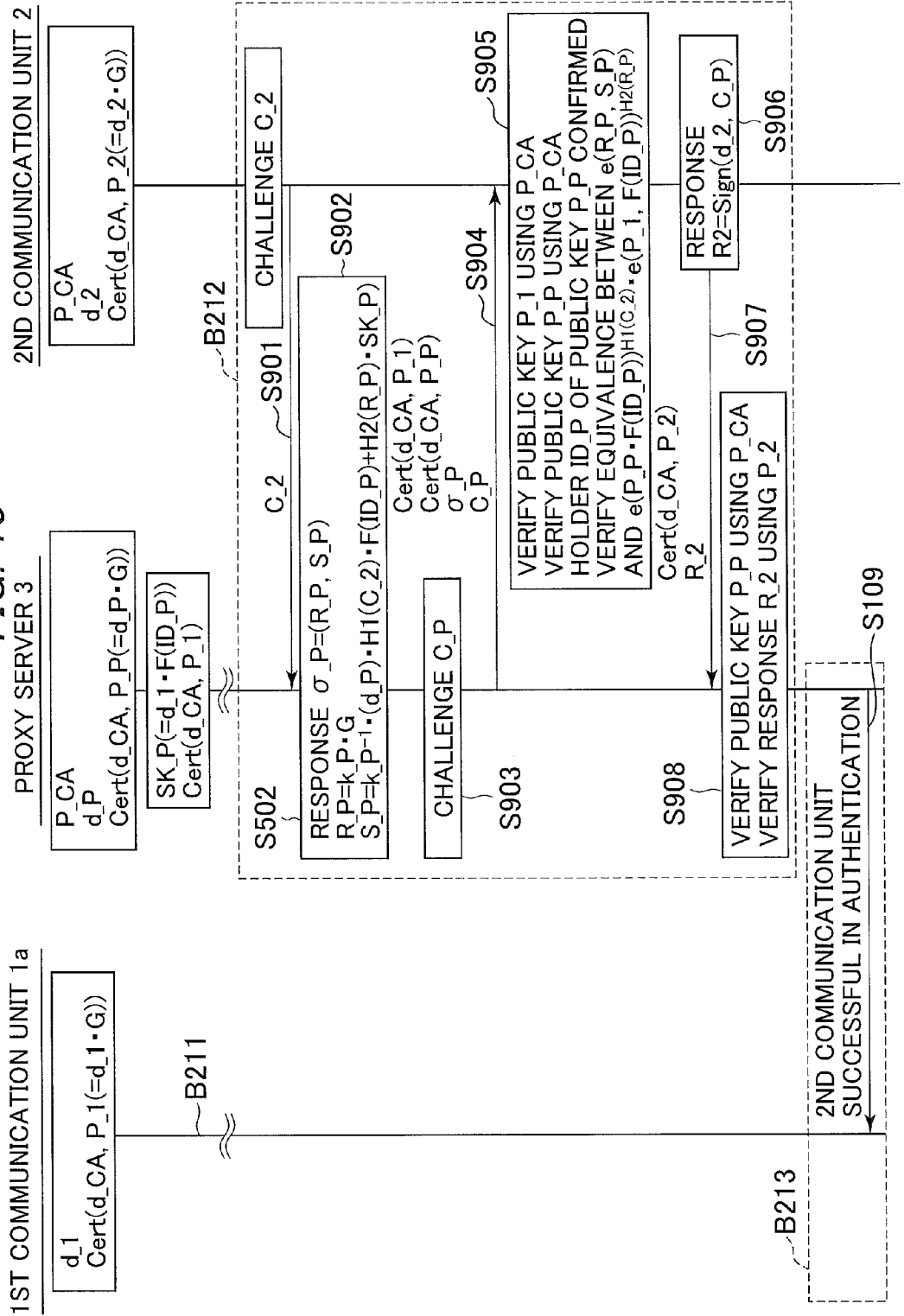
FIG. 13 is a sequence chart, like FIG. 9, useful for understanding the proxy operation of authentication by the certification authority system of the alternative embodiment.

An example of proxy operation of authentication by means of a certification authority will be described with reference to FIG. 13, which is a sequence chart useful for understanding such an operation according to the second preferred embodiment.

The operation B211 of authorizing proxy carried out by the first communication unit 1*a* to the proxy server 3 may be the same as the operation B111 of authorizing proxy described with reference to FIG. 9, and hence repeated description about it is refrained from.

Now, description will be made on the proxy process B212 of authentication based on the challenge/response authentication method. The authentication proxy is started when the proxy server 3 sends to the second communication unit 2 a request for starting the authentication. Upon receipt of the authentication request from the proxy server 3 in the second communication unit 2, the security processor 21 produces first challenge information C_2 having a sequence of random numbers for authenticating the proxy server 3. The transmitter 22 of the second communication unit 2 in turn transmits the first challenge information C_2 to the proxy server 3 (step S901). The security processing proxy 32 of the proxy server 3 receives the first challenge information C_2 through the receiver 35, and, in response to the challenge information C_2, generates first response information σ_P= (R_P, S_P) by using the entrust secret key SK_P obtained from the first communication unit 1*a* (step S902). Note that R_P=k_P•G∈G1, S_P=k_P−1•{d_P•H1(C_2)•F(ID_P)+H2 (R_P)•SK_P}∈G2.

The security processing proxy 32 further generates second challenge information C_P having a sequence of random numbers for authenticating the second communication unit 2 (step S903).

Then, the security processing proxy 32 sends through the transmitter 34 to the second communication unit 2 the generated first response information σ_P along with the second challenge information C_P, the public key certificate Cert(d_CA, P_1) of the first communication unit 1*a* and the public key certificate Cert(d_CA, P_P) of the proxy server 3 (step S904).

In the second communication unit 2, the security processor 21 receives via the receiver 23 the public key certificate Cert(d_CA, P_1) of the first communication unit 1*a*, the public key certificate Cert(d_CA, P_P) of the proxy server 3, the first response information σ_P and the second challenge information C_P.

The security processor 21 verifies the public key certificate Cert(d_CA, P_1) of the first communication unit 1*a* and the public key certificate Cert(d_CA, P_P) of the proxy server 3 by using the certification authority public key P_CA of the certification authority CA so as to get the public key P_1 of the first unit 1a and the public key P_P of the proxy server 3.

The security processor 21 then confirms whether the identification date ID_P of the proxy server 3 corresponds to the information tied to the public key P_P of the proxy server 3, which is recorded in the successfully verified public key certificate Cert(d_CA, P_P) of the proxy server 3, and figures out a pairing operation result e3 between two parameters R_P and S_P of the first response information σ_P.

The security processor 21 also figures out another pairing operation result e4 by using the public key P_1 of the first communication unit 1a, the identification ID_P and the public key P_P of the proxy server 3, the first challenge information C_2 generated by the security processor 21, and the parameter R_P of the first response information σ_P.

The security processor 21 then checks on whether or not the pairing operation results e3 and e4 are equivalent to each other (step S905). Thus, the security processor 21 can confirm that the first response information σ_P is one that was generated by means of the entrust secret key SK_P in response to the first challenge information C_2 the processor 21 generated.

The pairing operation result e3 is obtained by the following formulae:

$$e3 = e(R\_P, S\_P) \quad (3)$$
$$= e\left(k\_P \cdot G, k\_P - 1\left\{\begin{array}{c} d\_P \cdot H1(C\_2) \cdot F(ID\_P) + \\ H2(R\_P) \cdot SK\_P \end{array}\right\}\right)$$
$$= e(k\_P \cdot G, k\_P - 1 \cdot d\_P \cdot H1(C\_2) \cdot F(ID\_P)) \cdot$$
$$e(k\_P \cdot G, k\_P - 1 \cdot H2(R\_P) \cdot SK\_P)$$
$$= e(G, F(ID\_P))d\_P \cdot H1(C\_2) + d\_1 \cdot H2(R\_P) \in G3$$

The pairing operation result e4 is obtained by the following formulae:

$$e4 = e(P\_P, F(ID\_P))H1(C\_P) \cdot e(P\_1, F(ID\_P))H2(R\_P) \quad (4)$$
$$= e(d\_P \cdot G, F(ID\_P))H1(C\_P) \cdot e(d\_1 \cdot G, F(ID\_P))H2(R\_P)$$
$$= e(G, F(ID\_P))d\_P \cdot H1(C\_2) + d\_1 \cdot H2(R\_P) \in G3$$

Figure 9:
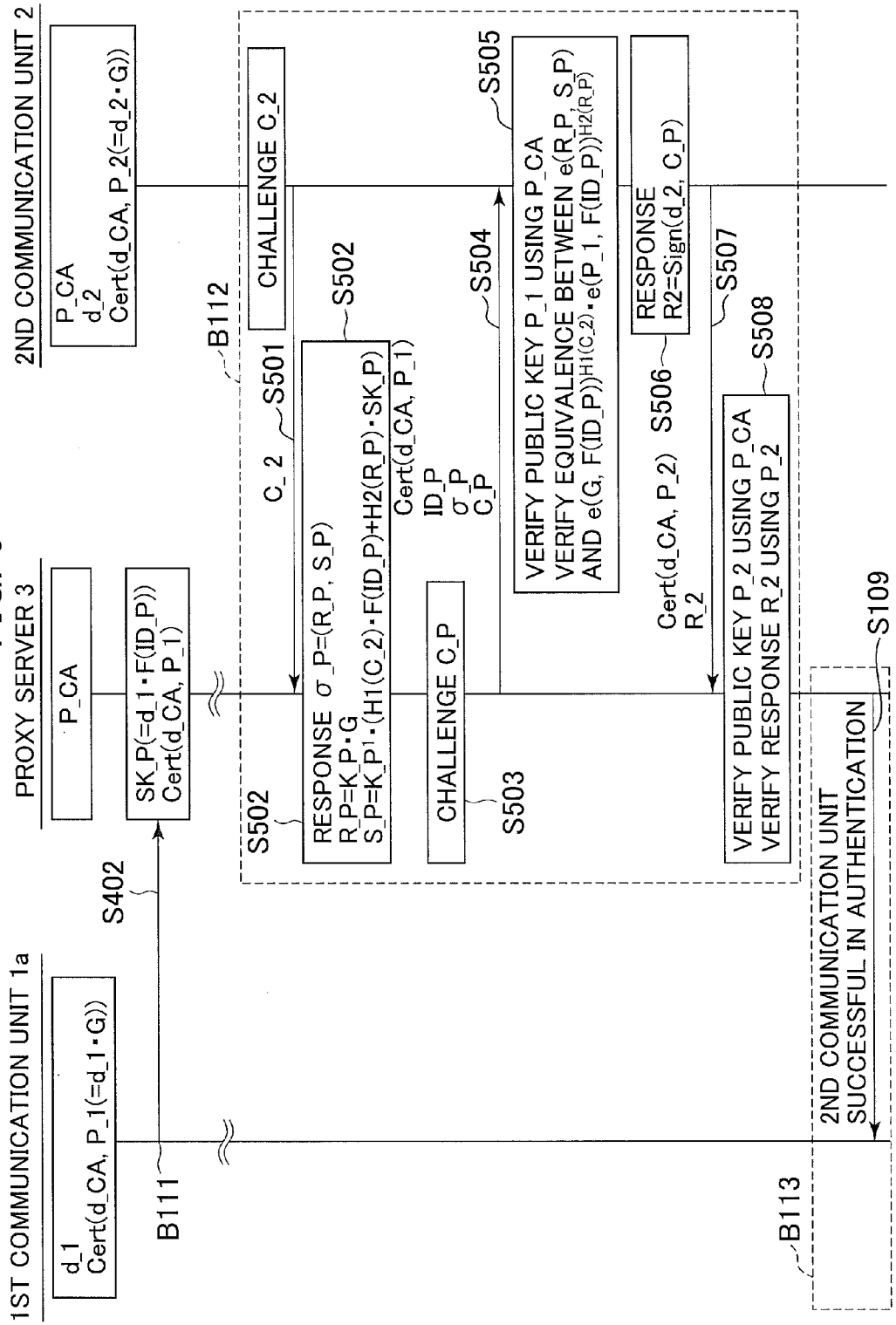
FIG. 9 is a sequence chart useful for understanding the proxy operation of authentication by the certification authority system of the preferred embodiment.

Successive steps S906 to S908 may be the same as steps S506 to S508 shown in FIG. 9, and therefore the description about them is not repeated.

The process B213 of notifying the processing result may be similar to the operation B113 of notifying a processing result described with reference to FIG. 9, so that the description about it is not repeated.

In summary, the second preferred embodiment is advantageous in that even if the delegation information 7 trusted to the proxy server 3 from the first communication units 1 were leaked out from the proxy server 3, the secret key of the first communication units 1 would not be identified and, in addition to that, unauthorized actions by a third party except the proxy server 3 as substitute for the first units 1 can be prevented.

D. Another Alternative Preferred Embodiment

Now, another, or third, embodiment of the security processing proxy system in accordance with the present invention will be described in detail further with reference to the accompanying drawings. The third embodiment may also be applied to the telecommunications network system 5 shown in FIG. 1. Moreover, the third embodiment may also be applied to the first communication units 1, the second communication unit 2 and the proxy server 3 having the internal structures shown in FIGS. 2, 3 and 4.

In the third embodiment, the first communication unit 1, FIG. 2, may differently operate from the illustrative embodiments described so far in terms of the delegation information generator 11.

More specifically in the third embodiment, the delegation information generator 11 may basically be the same in operation as the illustrative embodiments described earlier, except that the generator 11 sets a term of validity to the generated delegation information 7.

The delegation information generator 11 may generate, based on the PGP encryption, for example, delegation information 7 including a public key P_x for the proxy server 3 and a public key certificate Cert(d_1, P_x:T_P) of the first communication unit 1a for time information T_P defining a delegation term to the proxy server 3 by attaching a signature with the secret key d_1 of the first unit 1a. In this connection, the public key certificate Cert(X, Y:Z) represents a public key Y which is certified by X as being valid for Z hours.

Furthermore, as described in connection with the second embodiment, the delegation information generator 11 may generate as delegation information an entrust public key certificate Cert(d_1, P_P:T_P) when a signature is attached to the public key P_P of the proxy server 3. It is noted that the time information T_P may be information indicative of time limit of delegating authority of proxy to the proxy server 3, for instance, but may not be limited thereto. By way of example, the time information T_P may include date and time of the delegation term. Alternatively, the time information may include, in addition to the delegation term, the date and time at which the delegation is to be started so as to restrict the delegation term.

The delegation information generator 11 may generate, based on a certification authority, for example, a point F(ID_P•T_P) on an elliptic curve by adding the time information T_P about the term of delegation to the proxy server 3 to the public key generated from the identification ID_P of the proxy server 3 to thereby generate an entrust secret key SK_P=d_1•F(ID_P)∈G2 as delegation information 7 for the point F(ID_P•T_P), where the mark "•" denotes a linkage of the information. In this case, the delegation information generator 11 provides the entrust secret key SK_P and the term of delegation T_P as the delegation information 7 to the delegation information notifier 12.

In the third embodiment, the proxy server 3, FIG. 3, may differently operate from the illustrative embodiments described so far in terms of the delegation information acquirer 31 and the security processing proxy server 32.

More specifically in the third embodiment, the delegation information acquirer 31 may basically be the same as the illustrative embodiments described earlier, expect that the delegation information given in trust by the first communication units 1 has a term of validity.

For example, in the PGP encryption, the delegation information acquirer 31 may acquire, as public key certificate of the proxy server 3 issued by the first communication units 1, a public key certificate Cert(d_1, P_x:T_P) of the first communication units 1 or an entrust public key certificate Cert(d_1, P_P:T_P).

Based upon a certification authority, the delegation information acquirer 31 may acquire delegation term information TP as well as the entrust secret key SK_P(=d_1•F (ID_P•T_P)).

In the third embodiment, the security processing proxy 32 may operate in the same way as the first and second embodiments to perform security processing between the first and second communication units 1 and 2 on behalf of the first unit 1, but may be different in that the open information supplied to the second unit 2 has a term of validity.

By way of example, based on the PGP encryption, the security processing proxy 32 may supply the transmitter 34 with the entrust public key certificate Cert(d_1, P_x:T_P) or the entrust public key certificate Cert(d_1, P_P:T_P) as a public key certificate of the proxy server 3 issued by the first communication units 1.

Furthermore, by using a certification authority, the security processing proxy 32 may supply the transmitter 34 with the delegation term information TP as well as the public key certificate and the identification of the proxy server 3.

The description on how the security processing proxy 32 carries out security processing by using the PGP encryption and a certification authority will be made later in connection with the operations of security processing.

In the third embodiment, the second communication unit 2, FIG. 4, may differently operate from the first or second embodiment in terms of the security processor 21.

More specifically, the security processor 21 may perform the security processing with other communication units, as with the first or second embodiment, but differently from the first embodiment in the verification of the delegation term given to the proxy server 3.

For instance, based on the PGP encryption, the security processor 21 conducts the verification of the validity of the entrust public key certificate Cert(d_1, P_x:T_P) generated by the first communication unitw 1 or the entrust public key certificate Cert(d_1, P_P:T_P) by using the public key P_1 of the first communication unitw 1. In addition to that, the security processor 21 may check on whether or not the term of validity T_P of the delegation expires so as to perform the security processing only when the term of validity is confirmed effective.

Furthermore, the security processor 21 may check, by using a certification authority, on whether or not the term of validity T_P of the delegation expires. Only when the term is confirmed as valid, the term of validity T_P thus confirmed valid and the identification ID_P of the proxy server 3 may be used to perform the security processing.

The description on how the security processor 21 carries out security processing by using the PGP encryption and a certification authority will be made later in connection with the operations of security processing.

Figure 14:
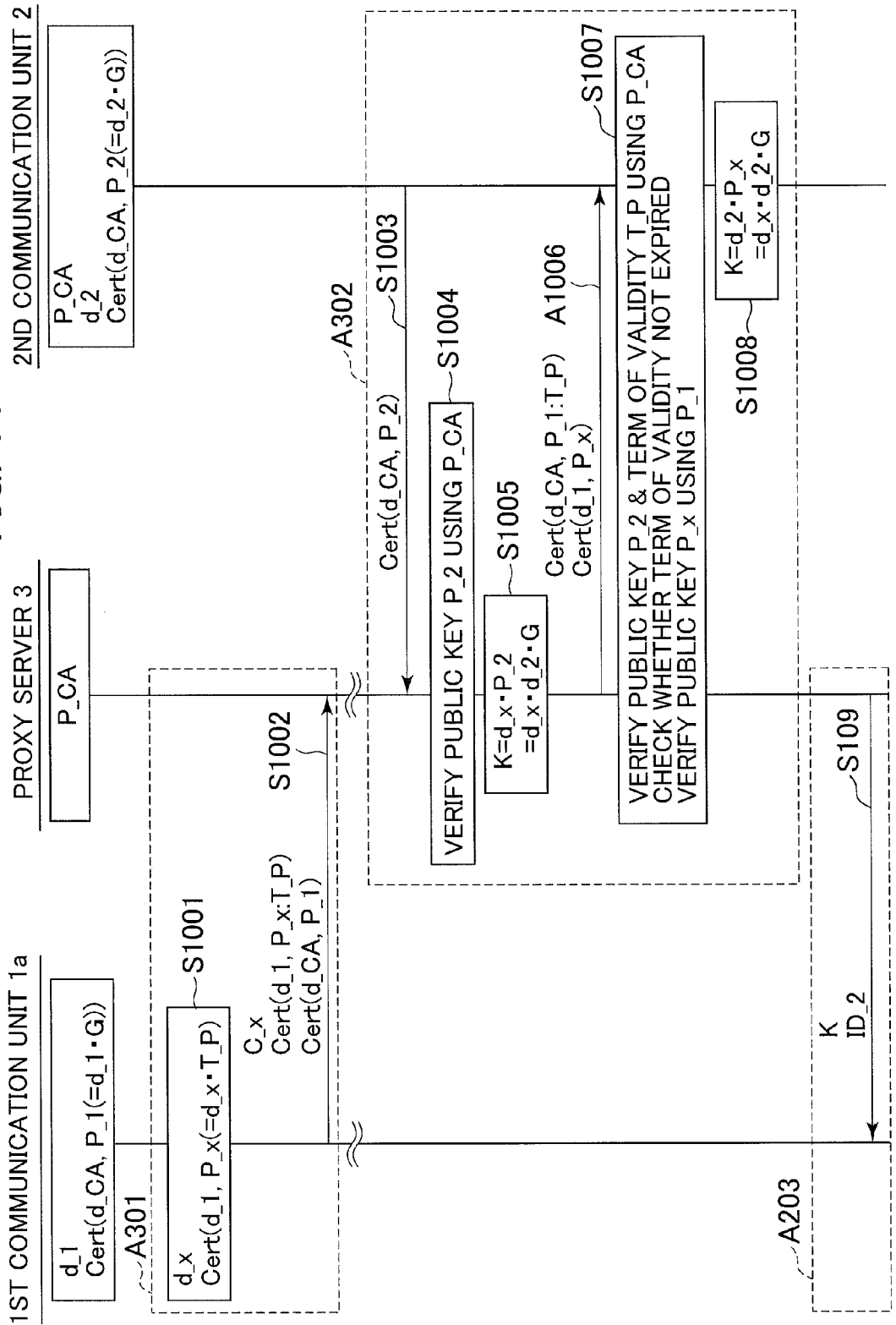
FIG. 14 is a sequence chart, like FIG. 5, useful for understanding the proxy operation of key exchange by the PGP encryption of another alternative preferred embodiment.
Figure 15:
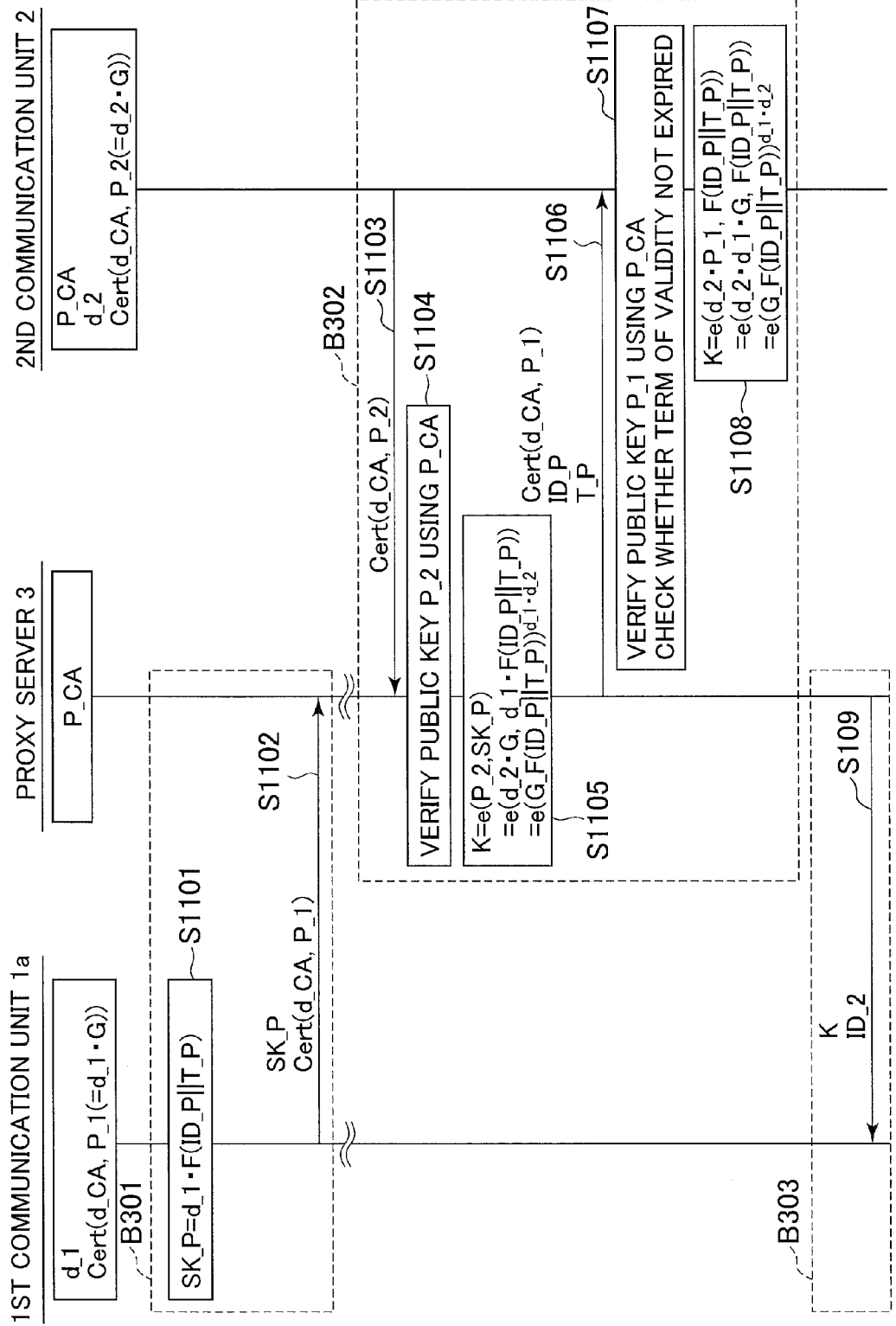
FIG. 15 is a sequence chart, like FIG. 8, useful for understanding the proxy operation of key exchange by means of a certification authority of the other alternative preferred embodiment.

Now, detailed description on the operations of the security processing proxy system according to the third embodiment will be made by referring FIGS. 14 and 15. The operations of the security processing proxy system in the third embodiment may differ from the first or second embodiment in that the first communication units 1 set a term of validity to the delegation information 7 to be given to the proxy server 3, and during the security processing procedure, the second communication unit 2 confirms whether or not the delegation information 7 supplied by the proxy server 3 is valid.

The operations of the security processing proxy system according to the third embodiment described below can be applied to the system of the first and second embodiments. The description will be directed to an example where the proxy system of the third embodiment is applied to the key exchange processing based on the PGP encryption and the certification authority scheme according to the first embodiment.

An example of proxy operation of key exchange by the PGP encryption will be described with reference to FIG. 14, which is a sequence chart for use in describing such an operation in the third embodiment.

In the process A301 of authorizing proxy, in a first communication unit 1a, the delegation information generator 11 generates a pair of entrust public keys, i.e. an entrust secret key d_x and an entrust public key P_x, according to appropriate one of the public key cryptographic algorithms. The delegation information generator 11 further generates an entrust public key certificate Cert(d_1, P_x:T_P), in which the delegation term information T_P of the proxy server 3 is included, for the generated entrust public key P_x by attaching a signature with the secret key d_1 of the first communication unit 1a (step S1001).

The delegation information generator 11 also generates an entrust secret key d_x and entrust information 17 for notifying the proxy server 3 about the entrust public key certificate Cert(d_1, P_x:T_P) and the public key certificate Cert(d_CA, P_1) of the first communication unit 1a, and sends the generated delegation information signal 16 to the proxy server 3 by means of the transmitter 14 (step S1002).

In the process A302 of key exchange proxy, the operations of steps S1003 to S1005 may be the same as steps S103 to S105 shown in FIG. 5, and the description about it will not be repeated.

The proxy server 3 receives the delegation information signal 16 by means of the security processing proxy 32 through the receiver 35. The security processing proxy 32 derives from the delegation information signal 16 the entrust secret key d_x, the entrust public key certificate Cert(d_1, P_x:T_P) and the public key certificate Cert(d_CA, P_1) of the first communication unit 1a. The proxy 32 then transmits the entrust public key certificate Cert(d_1, P_x:T_P) and the public key certificate Cert(d_CA, P_1) of the first communication unit 1a to the second communication unit 2 through the transmitter 34 (step S1006).

In the second communication unit 2, the security processor 21 receives through the receiver 23 the public key certificate Cert(d_CA, P_1) of the first communication unit 1a and the entrust public key certificate Cert(d_1, P_x:T_P) produced by the first unit 1a sent from the proxy server 3. The security processor 21 verifies the public key certificate Cert(d_CA, P_1) of the first communication unit 1a by using the certification authority public key P_CA of a certification authority CA to derive the public key P_1 of the first unit 1a. The device 21 successively verifies the entrust public key certificate Cert(d_1, P_x:T_P) issued by the first communication unit 1a by using the public key P_1 of the unit 1a thus derived so as to confirm that the entrust public key P_x is a public key certified by the first unit 1a (step S107 according to FIG. 5).

The security processor 21 in turn refers to the delegation term information T_P to check on whether the proxy server 3 is effective as a substitute unit for the first communication unit 1a (step S1007).

Then, the security processor 21 uses the derived public key P_x and its own secret key d_2 to produce a common key K=d_2•P_x=d_2•d_x•G∈G1 (step S1008).

The process A303 of notifying the above processing result may be similar to the operation A103 of notifying a processing result described with reference to FIG. 5, and therefore the description about it will not be repeated.

An example of proxy operation of key exchange by means of a certification authority will be described with reference to FIG. 15, which is a sequence chart for use in describing such an operation in the third embodiment.

In the process B301 of authorizing proxy, in a first communication unit 1a, the delegation information generator 11 figures out a point $F(ID\_P\|T\_P) \in G2$ on an elliptic curve, which is associated with the identification information $ID\_P$ of the proxy server 3 and the delegation term information of the proxy server 3, according to appropriate one of the public key cryptographic algorithms, and then uses the secret key $d\_1$ of the first communication unit 1a to generate an entrust secret key $SK\_P = d\_1 \cdot F(ID\_P\|T\_P) \in G2$ to be given to the proxy server 3 (step S1101).

The delegation information generator 11 in turn generates delegation information 7 for notifying the proxy server 3 of the entrust secret key $SK\_P = d\_1 \cdot F(ID\_P\|T\_P) \in G2$ thus generated and the public key certificate $Cert(d\_CA, P\_1)$ of the first communication unit 1a, and sends the generated signal 16 to the proxy server 3 by means of the transmitter 14 (step S1102).

Figure 8:
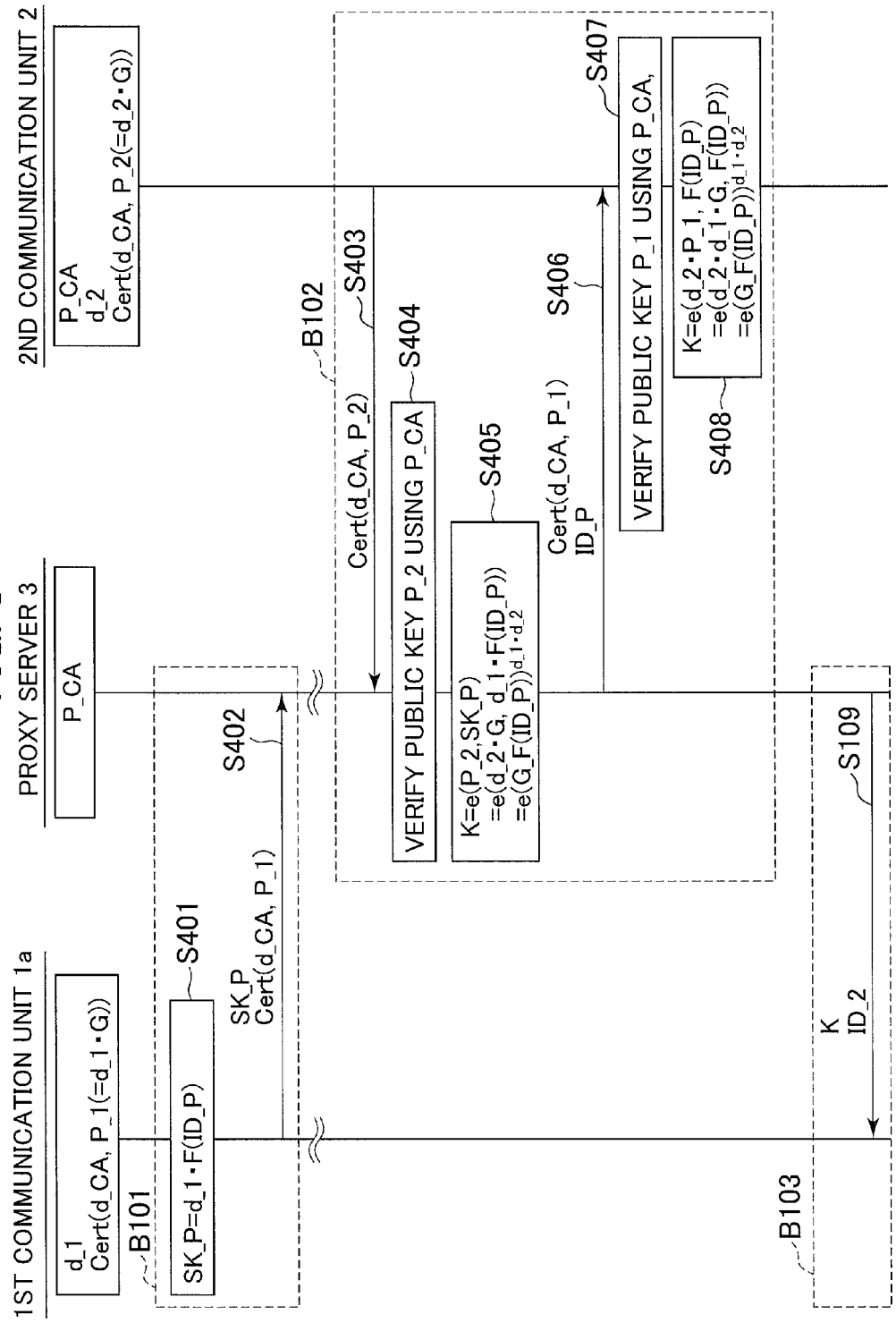
FIG. 8 is a sequence chart useful for understanding the proxy operation of the key exchange by means of a certification authority system of the preferred embodiment.

In the process B302 of key exchange proxy, the operations of steps S1103 and S1104 may be similar to steps S403 and S404 illustrated in FIG. 8, and therefore repeated description about will be avoided.

In the proxy server 3, the security processing proxy 32 supplies via the transmitter 34 to the second communication unit 2 with the public key certificate $Cert(d\_CA, P\_1)$ of the first communication unit 1a trusted therefrom and the identification date $ID\_P$ of the proxy server 3 as well as the delegation term information $T\_P$ of the proxy server 3 (steps S1105 and S1106).

In the second communication unit 2, the security processor 21 refers to the received delegation term information $T\_P$ of the proxy server 3 to check on whether the proxy server 3 is effective as a substitute unit for the first communication unit 1a (step S1107).

Then, the security processor 21 figures out a point $F(ID\_P) \in G2$ on an elliptic curve, which is associated with the identification $ID\_P$ of the proxy server 3, and produces a common key K on the basis of the point $F(ID\_P\|T\_P)$, the derived public key $P\_x$ and the secret key $d\_2$ of the second communication unit 2 (step S1108).

The process B303 of notifying the above processing result may be similar to the operation B103 of notifying a processing result described with reference to FIG. 8, and hence the description about it will not be repeated.

In short, the first communication units 1 in the third embodiment may set a term of validity to the delegation information 7 to be given in trust to the proxy server 3. Consequently, even if the proxy server 3 were ill-operated, that proxy server 3 would not identify the secret key of the first communication units 1 from the given delegation information 7. In addition, the period of time, during which the ill-operated proxy server 3 can take illegal proxy actions, can be rendered limitative.

Figure 16:
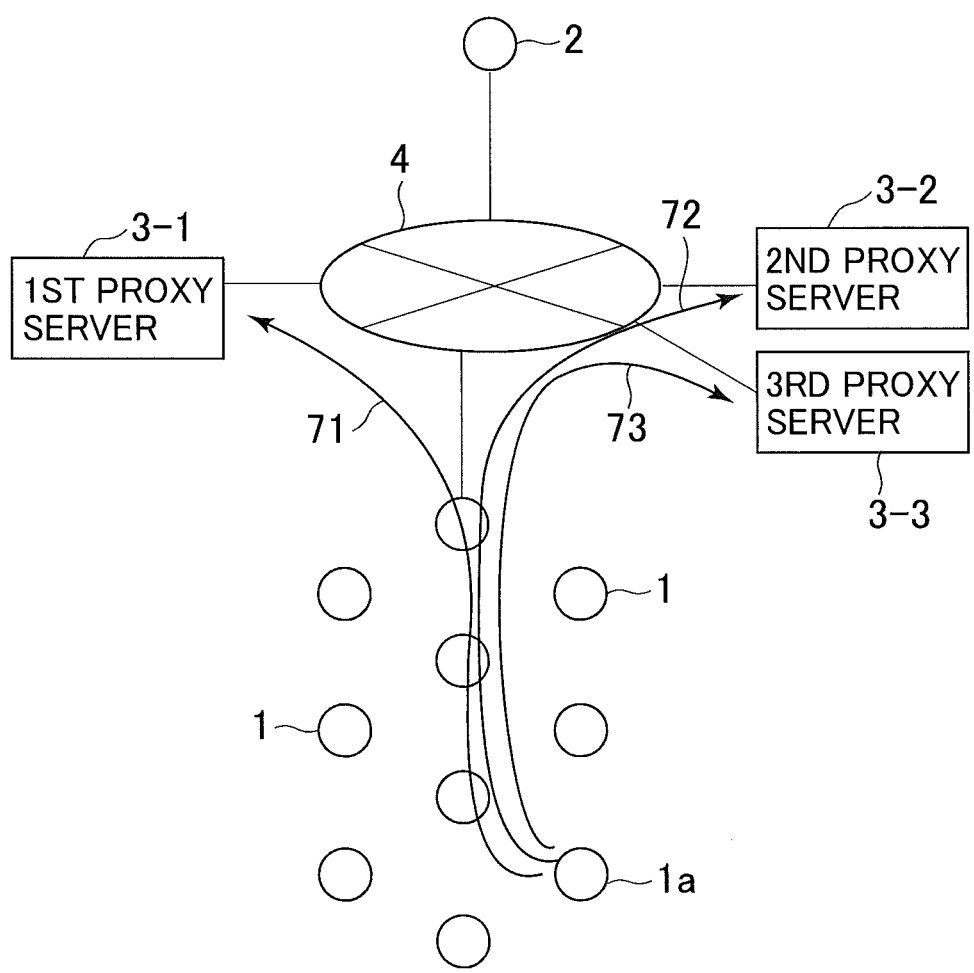
FIG. 16 is a schematic diagram showing a telecommunications network system for use in describing how the first communication unit in the other alternative preferred embodiment sets a term of validity of delegation information to switch between several proxy servers.

FIG. 16 exemplarily shows three proxy servers 3-1, 3-2 and 3-3, which proceed to exchanging delegation information 71, 72 and 73 respectively with a first communication unit 1a. The delegation information 71, 72 and 73 has its effective term valid exclusively on Jul. 25, Jul. 26 and Jul. 27, 2011.

E. Other Alternative Embodiments

Now, the variations of illustrative other embodiments of the present invention will be described.

In the above-described illustrative embodiments, the first communication units 1 may be sensor nodes or the like which form a multihop network, and the second communication unit 2 may be any types of server for providing services. The first and second communication units may, however, not be restricted thereto. The first communication units 1 and the second communication unit 2 are broadly applicable to any types of devices as long as the devices have a communication facility.

In the illustrative embodiments described so far, each first communication unit 1 may send the proxy server 3 the requests for starting the proxy operations of key exchange, authentication and encrypted communication path establishment between the first communication units 1 and the second communication unit 2. Alternatively, the second communication unit 2 may be adapted to send the request for starting the proxy operations to the proxy server 3 if the second unit 2 is already notified that the proxy server 3 has been a substitute for a first communication unit 1.

In the first, second and third embodiments, the public key cryptographic algorithm applied for encryption, generation of a signature and the like based on the PGP encryption or the certification authority scheme may use the elliptic curve cryptosystem, but the systems of cryptographic algorithm may not be limited thereto. For example, the public key cryptographic algorithm applied in the PGP encryption may use a system based on prime factorization problems for large numbers, such as RSA encryption, or a system based on discrete logarithm problems on elliptic curves, such as elliptic curve cryptography. In the certification authority scheme, the cryptographic algorithm may preferably use a system based on discrete logarithm problems infinite fields or on the elliptic curves. However, a signature for public key certificate formed for each communication unit by a certificate authority on PKI may not be restricted to the above, but can be based on prime factorization problems.

The security processing in the first, second and third embodiments employs the method for exchanging the public key certificates issued by a certification authority, but may not be limited to such a method. For instance, only identifications of the communication units concerned are exchanged therebetween, and the public keys and public key certificates associated therewith can be obtained from a separate directory server or equivalent.

In the security processing according to the third embodiment, the term of validity may be set to the delegation information 7 in order to limit the delegation authority of the proxy server 3. Alternatively, the first communication units 1 may generate and distribute over the network an expiration list of the delegation information 7 before the term of validity of the delegation information expires so as to invalidate the delegation information before the expiration of the term of validity of the information. Another way is that the PKI system can be replaced by an ID-based cryptosystem to thereby use the identification of the communication units concerned as public keys.

In the security processing in the first, second and third embodiments, the authentication may be carried out by using the public key cryptography, but the cryptography may not be limited thereto. A common key cryptography can bring about the similar advantages.

By way of example, the authentication in the security processing can be performed in such a manner that the first communication units 1 provide the proxy server 3 with a common key $K\_12'$ with one-way substitution for a common key $K\_12$ which is shared with the second communication unit 2, thereby using the common key $K\_12'$ for the authentication. Consequently, the first communication units 1 can leave the security processing to the proxy server 3 without providing the own secret key thereof to the proxy server 3.

In the proxy operation of key exchange in the illustrative embodiments described above, the key exchange may be conducted by solely using the public key certificates and the secret information exchanged between the proxy server 3 and the second communication unit 2, for the sake of simplicity, but the key exchange method may not be restricted thereto.

For example, the key exchange proxy may be executed in such a way that information on, e.g. random numbers, may be exchanged further between the proxy server 3 and the second communication unit 2 so as to allow the proxy server 3 and the second unit 2 to share a different key every time the key exchange is performed. By way of example, an ECMQV (Elliptic Curve Menezes-Qu-Vanstone) key exchange scheme suggests a method, in which both of the security processing proxy 32 of the proxy server 3 and the security processor 21 of the second communication unit 2 additionally produce a temporary public key pair to use the key pairs for the key exchange operation.

Moreover, in the operation of key exchange in the first, second and third embodiments, a consistent check may not be carried out on the common key after the key exchange, for simplifying the description, but may not be restricted thereto. For instance, the share of the same key information can be confirmed by exchanging the hash values of the common key.

In the proxy operation of encrypted communication path establishment in the first, second and third embodiments, the IPsec scheme may be applied for simplifying the description, but the application of such a scheme may not be restrictive. By way of example, the IPsec scheme can be applied to a handshake operation using TLS (Transport Layer Security) or DTLS (Datagram Transport Layer Security). The TLS or DTLS handshake also enables the proxy server 3 to perform the proxy of encrypted communication path establishment by implementing the security processing, which includes key exchange, decryption and generation of signatures, on behalf of the first communication units 1.

In the first, second and third embodiments, the certification authority scheme may use at least the identification ID_P of the proxy server 3 to produce the generator of the cyclic group G2.

Alternatively, the delegation information generator 11 of the first communication units 1 may arbitrarily select the generator of the cyclic group G2, or select from the generator of the cyclic group G1 instead of the generator of the cyclic group G2. In that case, the first communication unit 1 may generate a certificate Cert(d_1, G_x) by attaching a signature with its own secret key d_1 to the selected generator in order to prove the generation of the delegation information to the second communication unit 2. In this context, G_x represents the selected generator.

In the first embodiment, the delegation information generator 11 of the first communication units 1 may generate, based on the PGP encryption, the pair of the entrust secret key d_x and entrust public key P_x. Alternatively, the proxy server may generate the pair of the entrust secret key d_x and entrust public key P_x to notify the first communication units 1 of the generated entrust public key P_x so as to receive from the first communication units 1 an entrust public key certificate Cert(d_1, P_x) signed with the secret key d_1 of the first units 1.

According to the certification authority system in the third embodiment, as the generator of the cyclic group G2 may be generated based on the identification ID_P of the proxy server 3 and the delegation term information T_P, even when the delegation term information T_P is tampered into information T_P', e.g. the delegation term is extended improperly, the security processing will collapse, thereby preventing the illicit proxy operation. Alternatively, the certification authority system allows the first communication unit 1 to prove the validity of the delegation term information T_P by attaching a signature to the delegation term information T_P with its own secret key d_1.

The first, second and third embodiments may employ the system using a pairing code as the certification authority system, but the certification authority system may not be limitative. For example, a proxy re-encryption (signature) scheme can be adopted as the certification authority system, that is, the proxy server 3 may be provided beforehand with a proxy key produced by using the secret key of the first communication units 1 to convert a signature formed by the proxy server 3 into a signature of the first communication units 1 by using the proxy key. Alternatively, another scheme can be employed that allows the proxy server 3 to produce the proxy key from the secret key of the proxy server 3 so that the proxy server 3 can use the proxy key to convert an encrypted text, which can be decoded using the secret key of the first communication units 1 by the second communication unit 2, into another encrypted text, which can be decoded by using the secret key of the proxy server 3.

In the first, second and third embodiments, the security processing may include the key exchange, the authentication and the encrypted communication path establishment, but the processing may not be limited thereto. For instance, the security processing can include key delivery and network access authentication. In the network access authentication, an exchange of messages in the authentication proxy in accordance with the present invention can be executed on EAP (Extensible Authentication Protocol).

Figure 17:
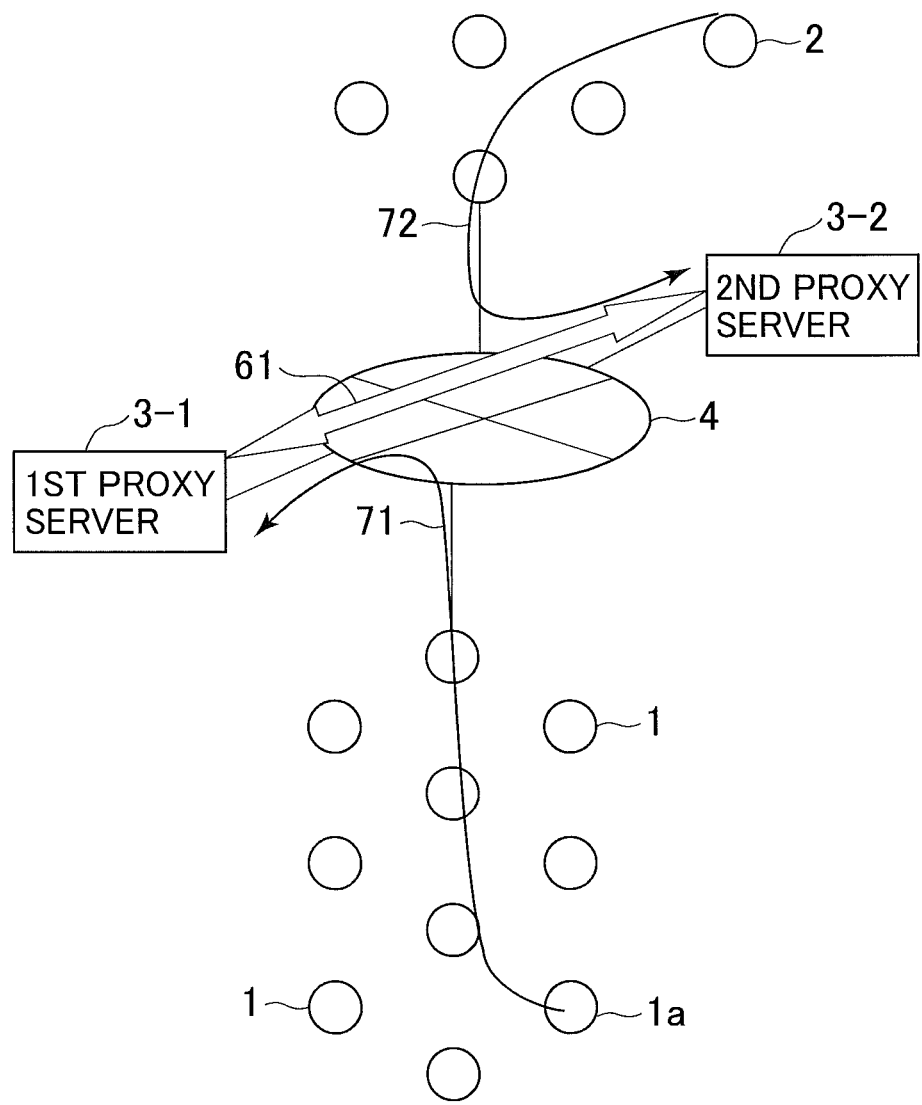
FIG. 17 shows a further alternative embodiment of the present invention in which two proxy servers proceed to security processing therebetween in proxy of the respective communication units.

In the illustrative embodiments described above, the security processing between the first communication units 1 and the second communication unit 2 may be performed by the proxy server 3 on behalf of the first communication units 1. Alternatively, as shown in FIG. 17, the security processing between the first and second communication units 1 and 2 may be implemented in such away that a first proxy server 3-1 acts for a first communication unit 1*a* as depicted with a line 71 while a second proxy 3-2 server acts for the second communication unit 2 as depicted with a line 72 so as to carry out security processing 61 between the first and second proxy servers 3-1 and 3-2.

In the illustrative embodiments described above, the key exchange proxy may be carried out in such a manner that the proxy server 3 exchanges the keys with the second communication unit 2 to obtain a common key, and then notifies the first communication units 1 of the common key. The key to be used between the first and second communication units 1 and 2 may, however, not be necessarily the common key notified by the proxy server 3.

For instance, the first communication units 1 and the second communication unit 2 additionally generate a common key based on the notified common key to thereby share the key thus generated by concealing it from the proxy server 3 so as to be able to use the shared key between the first units 1 and the second unit 2.

More specifically, the additional common key may be shared by using a one-way conversion of secret data shared only between the first communication units 1 and the second communication unit 2.

In the PGP encryption, the delegation information generator 11 of the first communication units 1 divides the entrust secret key d_x into two keys d_x1 and d_x2, where d_x=d_x1•d_x2, and provides only the key d_x2 as the entrust secret key to the proxy server 3. Then, the proxy server 3 carries out an operation K'=d_x2•P_2 by using the key d_x2, and the first communication unit 1 may use the key d_x1 to carry out an operation K=d_x1•K' to thereby share the key between the first and second communication units 1 and 2 in secret from the proxy server 3.

In the certification authority scheme, the delegation information generator 11 of the first communication units 1 may not also provide the key SK_P to the proxy server 3. As a consequence, the proxy server 3 performs an operation K'=e(P_2, F(ID_P)) while the first communication units 1 perform another operation K=K'd_1 so as to share the key between the first and second communication units 1 and 2 in secret from the proxy server 3.

In the first, second and third embodiments, the proxy server 3 may exist on the telecommunications network 4, but may not be restrictive.

By way of example, the proxy server 3 may exist on a route between the first communication units 1 and the second communication unit 2, e.g. as a gateway server lying between the first communication units 1 and the telecommunications network 4. Alternatively, it may be a server device on a network that does not exist on the route between the first and second communication units 1 and 2.

In accordance with the first, second and third embodiments, the first communication units 1 may be notified of a security processing result by the proxy server 3. In this connection, the first communication units 1 may be adapted to verify the propriety of the security processing. For instance, as with the first embodiment, the first communication units 1 can use the delegation information 7 including the information generated by the first units 1 for the security processing and the public key of the second communication unit 2 to verify the propriety of the result of the security processing conducted by the proxy server 3.

In the first, second and third embodiments, the proxy server 3 may perform the security processing on behalf of the first communication units 1 by exchanging the secret information with the second communication unit 2. Alternatively, the security processing may be implemented by using solely the secret information of the first communication units in such a way that the second communication unit 2 may encrypt and distribute the key information by using the public key of the first communication units 1 or only the second unit 2 can authenticate the first unit 1.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A security processing proxy system, comprising:
a first communication unit in a wireless multihop network that communicates with a further network, the first communication unit being one of a plurality of multihop communication units that relay messages among themselves in hops so as to communicate with the further network;
a second communication unit outside the wireless multihop network which communicates with the further network; and
a proxy server between the wireless multihop network and the further network which communicates with the further network and which acts for said first communication unit to conduct security processing with said second communication unit via the further communication network, the security processing including key exchange processing, authentication processing, or processing for providing compatibility of an encryption scheme,
wherein each of the second communication unit and the proxy server is connected to the further network independently of each other, and the wireless multihop network is connected to the further network via the proxy server,
wherein said first communication unit holds a public key of said first communication unit certified by a certification authority on a public key infrastructure (PKI) as well as secret information associated with a public key certificate of said first communication unit,
wherein said first communication unit includes:
a delegation information generator using the secret information of said first communication unit to generate delegation information required for the security processing; and
a delegation information notifier supplying the delegation information to said proxy server via the multihop network,
wherein said proxy server includes:
a delegation information acquirer acquiring the delegation information from said first communication unit; and
a security processing proxy transmitting the delegation information to said second communication unit via the further network to perform the security processing with said second communication unit,
wherein said second communication unit includes:
a receiver receiving the delegation information from said proxy server via the further network; and
a security processor using a certification authority public key held for verifying the public key certificate as being issued by the certification authority on the PKI to certify that the delegation information is generated by said first communication unit to thereby carry out the security processing with said proxy server, and
wherein at least one of said first communication unit, said second communication unit, and said proxy server is implemented on a computer.

2. The security processing proxy system in accordance with claim 1,
wherein said delegation information generator generates delegation information that includes information about a term of validity, and
wherein said security processor derives the information about the term of validity from the delegation information to determine whether or not the delegation information is valid to thereby carry out the security processing with said proxy server.

3. The security processing proxy system in accordance with claim 1,
wherein the delegation information includes:
(1) an entrust public key and/or an entrust secret key generated by said delegation information generator in conformity with an appropriate public key cryptographic algorithm;

(2) an entrust public key certificate produced by said delegation information generator by attaching a signature with the secret key of said first communication unit; and (3) a public key certificate of said first communication unit, and wherein said security processor:

derives from the delegation information, received via a receiver, the entrust public key, the entrust secret key, the entrust public key certificate, and the public key certificate of said first communication unit;

uses the held certification authority public key to certify the public key certificate of said first communication unit, thereby acquiring the public key of said first communication unit; and uses the public key of said first communication unit to verify the entrust public key certificate and to thereby certify that the entrust public key is generated by said first communication unit.

4. A security processing proxy system, comprising:

a first communication unit in a wireless multihop network that communicates with a further network, the first communication unit being one of a plurality of multihop communication units that relay messages among themselves in hops so as to communicate with the further network;

a second communication unit outside the wireless multihop network which communicates with the further network; and a proxy server between the wireless multihop network and the further network which communicates with the further network and which acts for said first communication unit to conduct security processing with said second communication unit via the further communication network, the security processing including key exchange processing, authentication processing, or processing for providing compatibility of encryption schemes, wherein each of the second communication unit and the proxy server is connected to the further network independently of each other, wherein said first communication unit holds a public key of said first communication unit certified by a certification authority on a public key infrastructure (PKI), a secret key of said first communication unit, and a public key certificate of said first communication unit as well as a certification authority public key for verifying the public key certificate as being issued by the certificate authority on the PKI, wherein said first communication unit includes:

a receiver receiving from said proxy server the public key certificate of said proxy server certified by the certification authority on the PKI; and a delegation information generator using the certification authority public key to verify the public key certificate of said proxy server and to thereby acquire the public key of said proxy server via the multihop network, wherein said delegation information generator produces an entrust public key certificate for certifying that the public key of said proxy server is signed by the secret key of said first communication unit, and additionally uses the entrust public key certificate and the public key certificate of said first communication unit to generate delegation information necessary for the security processing, and additionally sends the delegation information to said proxy server, wherein said proxy server includes:

a delegation information acquirer acquiring the delegation information from said first communication unit via the multihop network; and a security processing proxy transmitting the delegation information to said second communication unit to perform the security processing with said second communication unit, wherein said second communication unit includes:

a receiver receiving the delegation information from said proxy server via the further network; and a security processor using the certification authority public key acquired beforehand for verifying that the public key certificate as being issued by the certification authority on the PKI to certify that the delegation information is generated by said first communication unit to thereby carry out the security processing with said proxy server, and wherein at least one of said first communication unit, said second communication unit, and said proxy server is implemented on a computer.

5. The security processing proxy system in accordance with claim 4, wherein said delegation information generator generates delegation information including information about a term of validity, and wherein said security processor derives the information about the term of validity from the delegation information to determine whether or not the delegation information is valid to thereby carry out the security processing with said proxy server.

6. The security processing proxy system in accordance with claim 4, wherein said security processor uses the certification authority public key to verify the public key certificate of said first communication unit and the entrust public key certificate and to thereby acquire the public key of said first communication unit and the public key of said proxy server, and wherein said security processor uses the public key of said first communication unit to verify the entrust public key certificate to thereby certify that the entrust public key is produced by said first communication unit.

\* \* \* \* \*